(12) United States Patent
Janakiraman et al.

(10) Patent No.: US 12,327,478 B2
(45) Date of Patent: Jun. 10, 2025

(54) INTEGRATED FLIGHT DECK

(71) Applicant: Honeywell International Inc., Charlotte, NC (US)

(72) Inventors: Kirupakar Janakiraman, Madurai (IN); Kalimulla Khan, Bangalore (IN); Ramkumar Rajendran, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 182 days.

(21) Appl. No.: 18/174,553

(22) Filed: Feb. 24, 2023

(65) Prior Publication Data

US 2024/0194080 A1 Jun. 13, 2024

(30) Foreign Application Priority Data

Dec. 8, 2022 (IN) .............................. 202211070893

(51) Int. Cl.
*G08G 5/21* (2025.01)
*G06Q 10/047* (2023.01)
*G06Q 30/04* (2012.01)
*G08G 5/32* (2025.01)

(52) U.S. Cl.
CPC ............. *G08G 5/21* (2025.01); *G06Q 10/047* (2013.01); *G06Q 30/04* (2013.01); *G08G 5/32* (2025.01)

(58) Field of Classification Search
CPC .. G08G 5/0021; G08G 5/0034; G06Q 10/047; G06Q 30/04
See application file for complete search history.

(56) References Cited

U.S. PATENT DOCUMENTS 6,134,500 A * 10/2000 Tang .................... G05D 1/0005
73/178 R
6,542,796 B1 * 4/2003 Gibbs .................. G08G 5/0034
701/14

OTHER PUBLICATIONS

S. D. Young, T. et al. "Flight simulation study of airplane state awareness and prediction technologies," 2016 IEEE/AIAA 35th Digital Avionics Systems Conference (DASC), Sacramento, CA, USA, 2016, pp. 1-11, (Year: 2016).*

* cited by examiner

*Primary Examiner* — Gertrude Arthur Jeanglaude
(74) *Attorney, Agent, or Firm* — ALSTON & BIRD LLP

(57) ABSTRACT

A system for an aircraft configured to: provide one or more of the sensed aircraft characteristics to a flight planning tool for processing by one or more features of the flight planning tool; receive a recommended flight setting from the flight planning tool based on the processing by the flight planning tool; compare a current flight setting as determined based on the one or more sensed aircraft characteristics from the plurality of sensors with the received recommended flight setting; determine a potential operational efficiency based on the comparison between the received recommended flight setting and the current flight setting; and provide the potential operational efficiency to a user based on an identity of the user.

20 Claims, 19 Drawing Sheets

Events

🔍 Search

| Events | | | | | Version: All ⌄ | Time: Last 30 days ⌄ |
|---|---|---|---|---|---|---|
| Name | Count ↓ | Trend | Users | User change | Per user | |
| Nav View Feature | 29 | +29 | 3 | +3 | 9.67 | |
| ATCT Feature | 26 | +26 | 2 | +2 | 13 | |
| cRadar API | 24 | +24 | 2 | +2 | 12 | |
| Shortcut Advisor Feature | 21 | +21 | 2 | +2 | 10.5 | |
| Weather Hazard Avoidance Feature | 18 | +18 | 1 | +1 | 18 | |
| cFMS AC State API | 6 | +6 | 3 | +3 | 2 | |
| cFMS Fpin API | 6 | +6 | 3 | +3 | 2 | |
| Weather_Hazard_Avoidance – Diversion_Plans | 2 | +2 | 1 | +1 | 2 | |
| ATCT – Decode_ATC_Radio_Signals | 1 | +1 | 1 | +1 | 1 | |
| cFMS Upload Fpin API | 1 | +1 | 1 | +1 | 1 | |
| Shortcut_Advisor – Fuel_Savings | 1 | +1 | 1 | +1 | 1 | |

FIG. 8

0x102d00000 + 3677696
SIGTRAP  (Crash)  (Version 1.0 (12))  (1 user)  (2 reports)
Overview   Reports Stack traces MAIN THREAD - CRASHED
HoneywellIFD           0x102d00000 + 3677696
HoneywellIFD           0x102d00000 + 1661876
HoneywellIFD           0x102d00000 + 1664044
UIKitCore              - [UIApplication_handleDelegateCallbacksWithOptions:isSuspended:restorestate:]
HoneywellIFD           0x102d00000 + 1680252
HoneywellIFD           0x102d00000 + 1680056
HoneywellIFD           0x102d00000 + 1681376
▼ Expand               0x0 + 0

BACKGROUND THREAD 1
libsystem_kernel.dylib    __psynch_cvwait
E2E                       0x104108000v + 773808
E2E                       0x104108000v + 773020
E2E                       0x104108000v + 772816
E2E                       0x104108000v + 772700
libsystem_pthread.dylib   _pthread_start ▼ Expand BACKGROUND THREAD 2
libsystem_kernel.dylib    __psynch_cvwait
E2E                       0x104108000v + 773808
E2E                       0x104108000v + 773020
E2E                       0x104108000v + 772816
E2E                       0x104108000v + 772700
libsystem_pthread.dylib   _pthread_start ▼ Expand BACKGROUND THREAD 3
libsystem_kernel.dylib    __psynch_cvwait
E2E                       0x104108000v + 773808
E2E                       0x104108000v + 773020
E2E                       0x104108000v + 772816
E2E                       0x104108000v + 772700
libsystem_pthread.dylib   _pthread_start ▼ Expand

FIG. 12

INTEGRATED FLIGHT DECK

CROSS-REFERENCE TO RELATED APPLICATION(S)

This application claims the benefit of priority to Indian Provisional Patent Application No. 202211070893, filed Dec. 8, 2022, the entirety of which is incorporated by reference herein.

TECHNICAL FIELD

Various embodiments of the present disclosure relate generally to the field of control systems and, more particularly, to the field of control systems for aircraft.

BACKGROUND

Data analytic capabilities related to the avionics domain have been traditionally restricted to inferring insights from a post-flight analysis because real time data may be inaccessible during flights due to impossibilities of connection or prohibitive cost. This post-flight analysis can rely on recorded flight data that is limited due to storage restrictions and a lack of interconnected systems configured for generating data (e.g., systems unlike Aviation IoT systems). Further, the insights generated using such techniques can take days, weeks, or months to incorporate in routine operations and inefficiencies and anomalies may continue in flights between the generation of useful data and implementation of new programs and procedures based on the insights gleaned from such time-late data.

Even in connected aircraft systems, which may have in-flight connectivity and can provide such data to off-aircraft information technology systems during flight, there may be difficulties analyzing such data in real time due to the cost of transferring large amounts of data from the aircraft, latency and loss of connectivity during a flight, an indeterministic time response for certain real-time decision support systems, a lack of attribution/identification capabilities in on-board systems, and the like. The present disclosure is directed to overcoming one or more of these above-referenced challenges or shortfalls.

SUMMARY OF THE DISCLOSURE

According to certain aspects of the disclosure, methods and systems of providing real time insight using data collected from one or more systems integrated with a virtual flight deck are disclosed.

For instance, in one embodiment, a system for an aircraft includes a plurality of sensors configured to sense one or more aircraft characteristics of an aircraft system and generate a signal based on the sensed aircraft characteristic, a processing device communicatively coupled to the plurality of sensors, and a memory communicatively coupled to the processing device and storing processor-readable instructions that when executed by the processing device cause the system to: provide one or more of the sensed aircraft characteristics to a flight planning tool for processing by one or more features of the flight planning tool; receive a recommended flight setting from the flight planning tool based on the processing by the flight planning tool; compare a current flight setting as determined based on the one or more sensed aircraft characteristics from the plurality of sensors with the received recommended flight setting; determine a potential operational efficiency based on the comparison between the received recommended flight setting and the current flight setting; and display or transmit the potential operational efficiency to a user based on an identity of the user.

In another embodiment, a method includes: providing one or more sensed aircraft characteristics to a flight planning tool for processing by one or more features of the flight planning tool; receiving a recommended flight setting from the flight planning tool based on the processing by the flight planning tool; comparing a current flight setting as determined by one or more of a plurality of sensors with the received recommended flight setting; determining a potential operational efficiency based on the comparison between the received recommended flight setting and the current flight setting; and providing the potential operational efficiency to a user based on an identity of the user.

In yet another embodiment, a method of operating an aircraft includes: providing one or more of sensed aircraft characteristics to a flight planning tool for processing by one or more features of the flight planning tool; receiving a recommended flight setting from the flight planning tool based on the processing by the flight planning tool; comparing a current flight setting as determined by one or more of a plurality of sensors with the received recommended flight setting and automatically logging the current flight setting in a flight log; determining a potential operational efficiency based on the comparison between the received recommended flight setting and the current flight setting; and providing the potential operational efficiency to a user based on an identity of the user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 8 depicts one or more events tracked using a flight management system for providing one or more key performance indicators.

FIG. 12 depicts an exemplary log of events for tracking one or more events using a flight management system.

DETAILED DESCRIPTION OF EMBODIMENTS

Various embodiments of the present disclosure relate generally to the field of generating insights based on a flight management system. While this disclosure describes the methods and systems with reference to aircraft, it should be appreciated that the present methods and systems may be applicable to various other vehicles.

Figure 1:
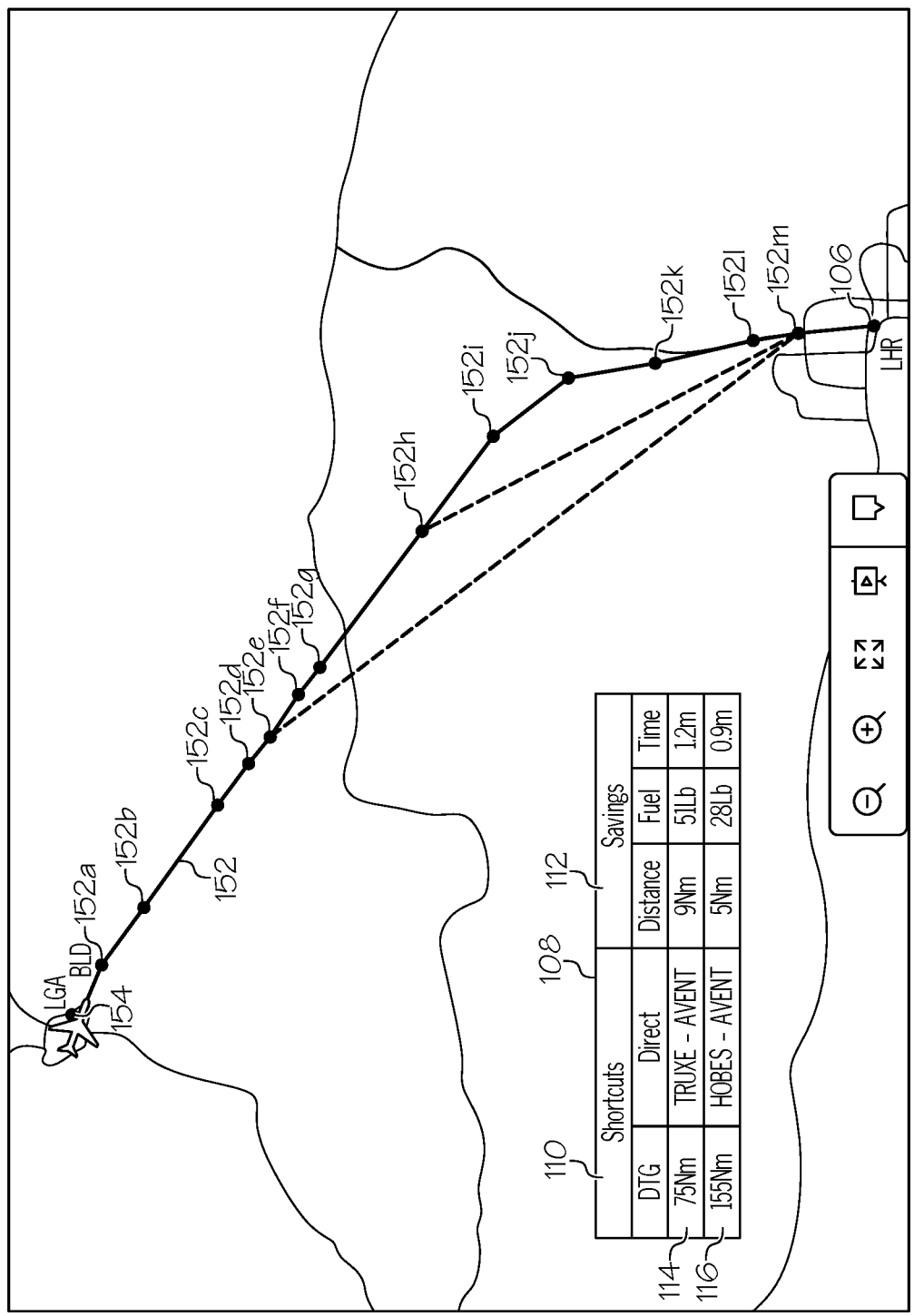
FIG. 1 depicts an exemplary GUI for utilizing an integrated flight deck, according to one or more embodiments.

FIG. 1 depicts an exemplary GUI 101 including an exemplary flight path 102 for a flight from a first airport 104 (e.g., New York's LaGuardia) to a second airport 106 (e.g., London's Heathrow). It is to be understood that these airports are merely exemplary choices and the flight could be from any takeoff location to any landing location. The flight path 102 includes a number of waypoints 102a, 102b, etc. The exemplary GUI 101 includes a chart 108 that shows a shortcuts section 110 and a savings section 112. The shortcuts section 110 may include information related to a first shortcut 114 and a second shortcut 116, which may be flight paths in between various waypoints of the original flight path 102. If the shortcuts were utilized by the crew operating the flight, it would cause the savings shown in the savings section 112. The savings could be based on, for example, distance, fuel, time, or other factors (e.g., dollars). Specifically, utilizing the first short cut 114 would save 9 nautical miles (Nm), 51 pounds (Lbs) of fuel, and 1.2 minutes from the originally path 102. The second short cut would save 5 Nm, 28 lbs of fuel, and 0.9 minutes of time. This information could be displayed to a user of the flight management system to make one or more decisions regarding the flight path and the decisions made could be tracked and savings based on such decisions reported to a user of the flight management system.

Figure 2:
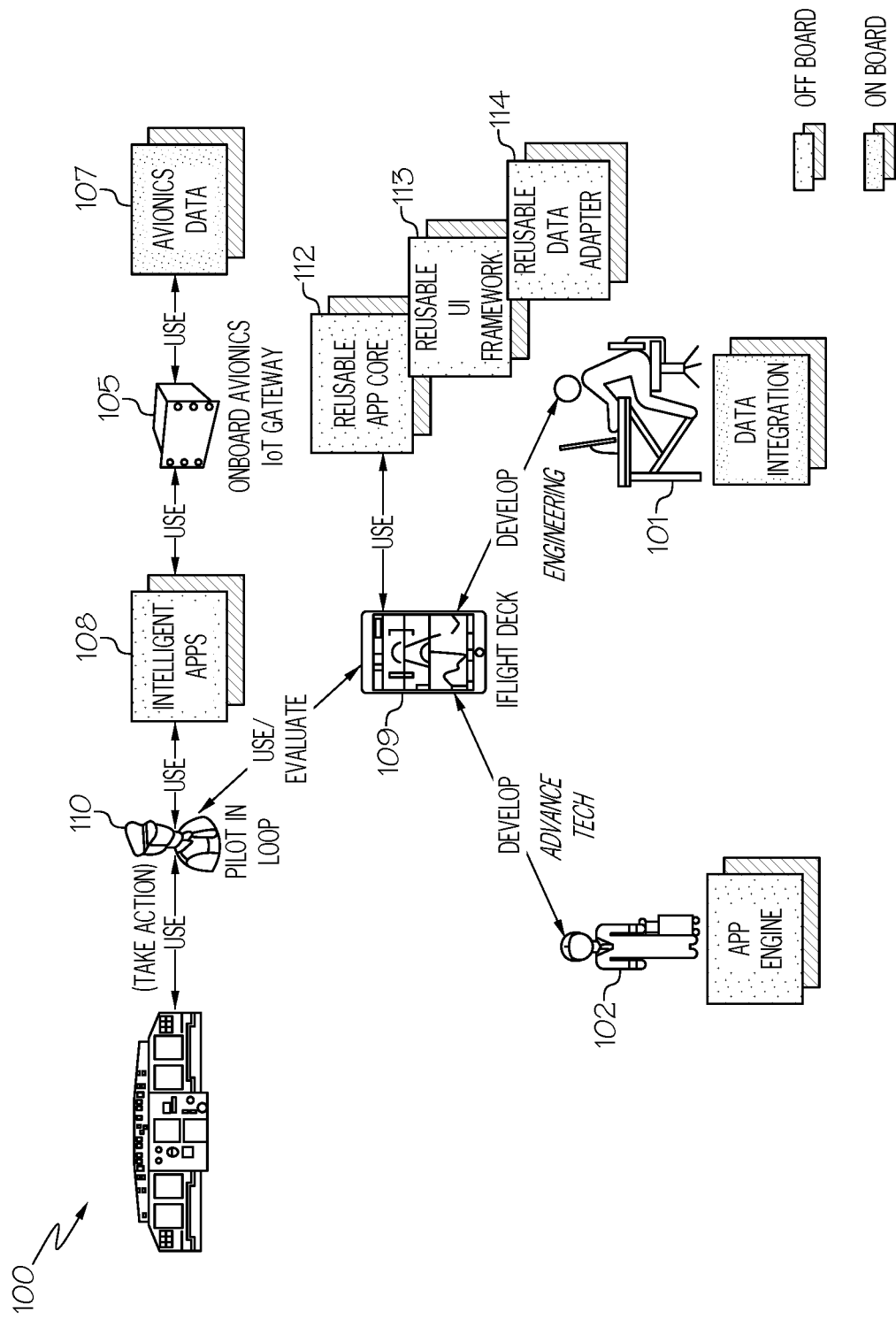
FIG. 2 depicts an exemplary diagram of a data flow for an exemplary aircraft-based network system.

FIG. 2 depicts exemplary avionics and related connected systems which may be connected in a data flow 100, according to one or more embodiments. In step 101, an operator and/or engineer may use "data integration" engines to develop rules and/or one or more applications ("Engineering") using an integrated flight deck (IFD) 109, which can be a cloud based dashboard and may be displayed, for example, using the PED 50 of FIG. 2. In step 102, a safety officer and/or flight data analysis may use an app engine to develop SDKs ("Advance Tech") that configure one or more applications, such as, for example, self-contained mission managers, virtual electronic flight books, or cloned cockpit dashboards in the IFD 109. In steps 112, 113, and 114, a reusable app core 112, reusable user interface framework 113, and reusable data adapter 114, respectively, may pack metadata and send that metadata to edge hardware via IFD 109 (e.g., using an orchestrator of a networked computing system, as discussed more particularly herein). In step 105, an onboard gateway (e.g., the avionics IoT gateway 105 of FIG. 2) may deliver avionics data 107 to an edge analytics software development kit (SDK) associated with intelligent apps 108. The avionics data 107 may be consumed data through the SDK of intelligent apps 108, at step 105. As used herein, avionics data can refer to data generated by one or more avionics systems including, for example, communications, navigation, display and management systems, aircraft flight control systems, fuel systems, collision avoidance (e.g., airborne and ground) systems, flight recorders, weather systems, and aircraft management systems. The onboard intelligent applications 108 may be configured to consume the avionics data 107 via the onboard avionics IoT gateway (step 105) to deliver one or more inferences, suggestions, or recommended actions to pilot 110 and/or crew of the aircraft using the IFD 109 (e.g., one or more actions that the pilot can take or the aircraft can perform to result in changing a flight operation, such as flight operation savings. Flight operation savings can be directed towards safety, maintenance, weather related operations, fuel conservation, resource management, etc. An actionable update (e.g., a sync) may then be made to system 111. In some embodiments, the actionable inferences, recommendations, and suggestions along with additional information may be provided to an electronic flight bag application and/or one or more external or internal applications by the aircraft data gateway.

Figure 3A:
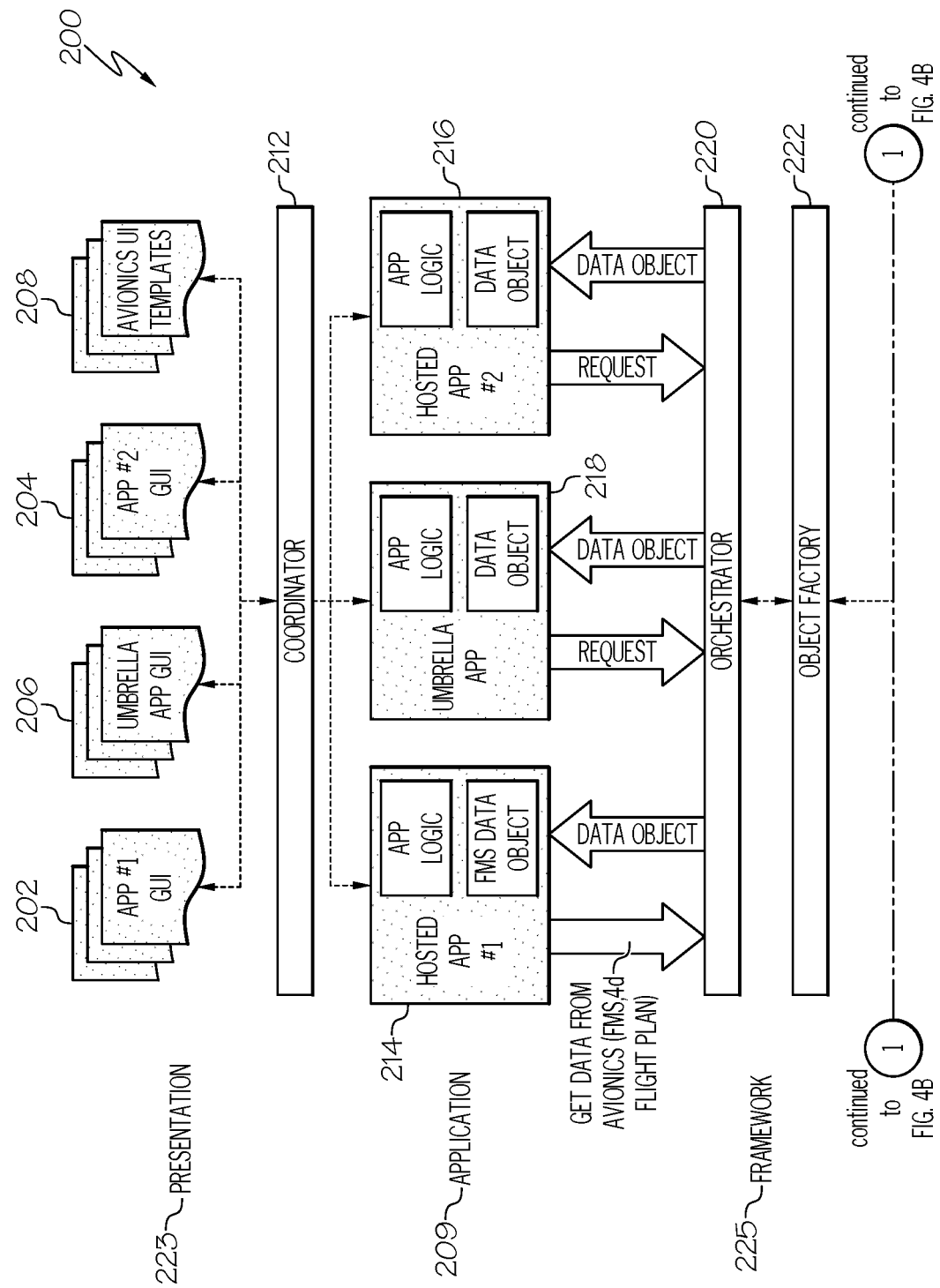
FIG. 3A depicts a portion of a schematic block diagram of a framework of a platform of the networked computing system environment of FIG. 2.
Figure 3B:
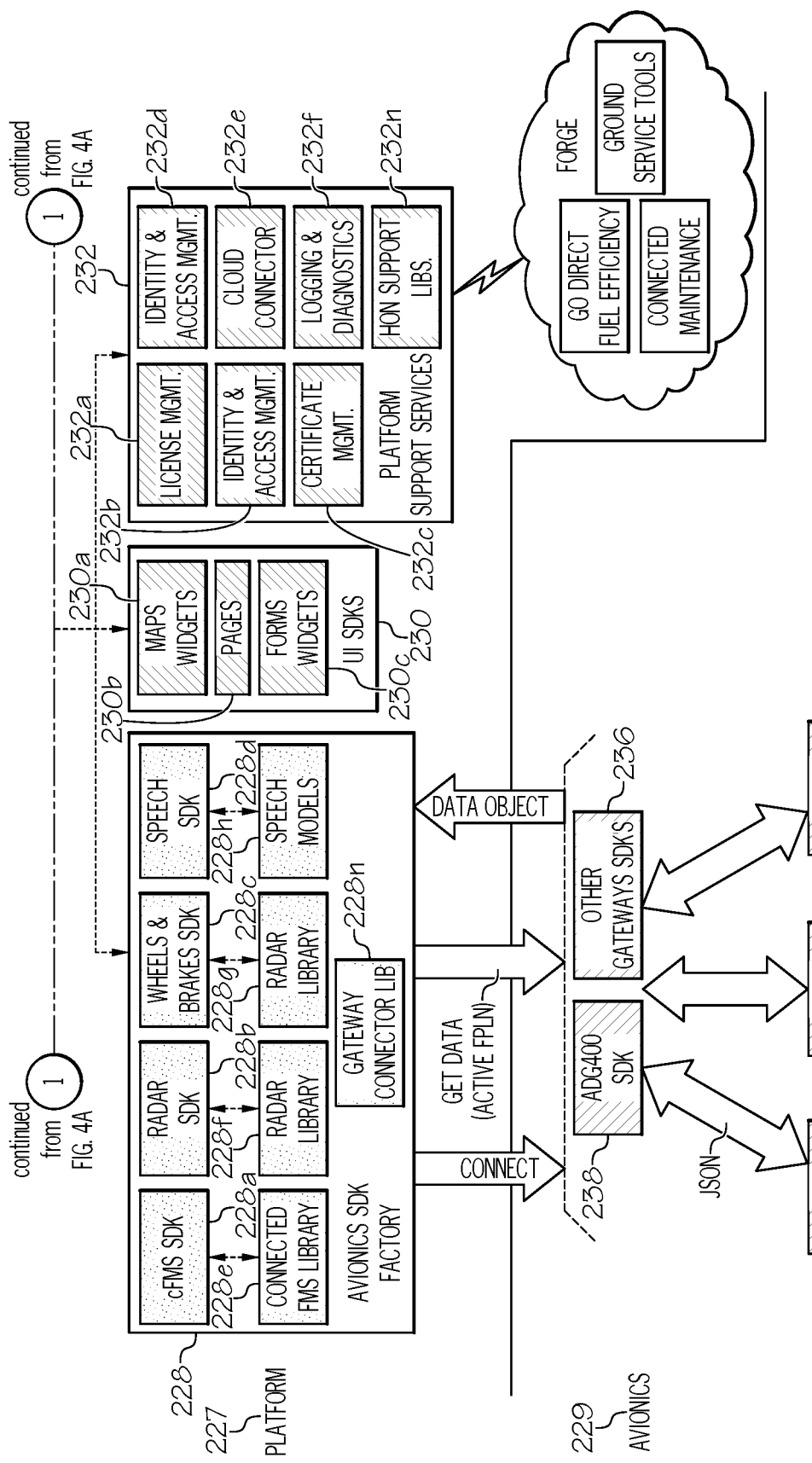
FIG. 3B depicts a portion of a schematic block diagram of a framework of a platform of the networked computing system environment of FIG. 2.

FIG. 3A and FIG. 3B depict an exemplary high-level architecture of herein disclosed system 200. Specifically, system 200 describes an example IFD platform configured to provide end-to-end real-time data acquisition (e.g., to provide real-time flight insights and maintenance alerting) with seamless access to data from multiple and at times different or varying data sources (e.g., data from avionics data sources) and flexibility to configure events or report fault events. System 200 includes advanced fault detection logic that can be incorporated to identify anomalies without the constraint of computational power and data access. In turn, real-time detection helps end users (e.g., flight crew) to perform self-contained mission management and/or to take corrective actions to prevent operational disruptions.

As shown in FIG. 3A and FIG. 3B, the overall architecture of system 200 is illustrated including the SDK components and corresponding framework. System 200 uses real-time accurate models and visual analytics to deliver one or more cloned dashboards and/or virtual EFBs locally and/or remotely, during ground operations, inflight, and in real-time to the end user (e.g., a pilot, flight crew, etc.). System 200 is extensible and portable for deployment in any cloud or data center environment for providing an enterprise-wide, top to bottom view, displaying the status of processes, assets, people, and safety. System 200 includes a collection of framework components, SDKs, UI libraries, and rules that specify how applications are developed from the platform and how additional SDKs and UI libraries can be added to the platform. Further, system 200 supports end-to-end capability to execute digital twins (e.g., a digital avionics engine)

against process data and to translate the output into actionable changes to one or more avionics systems as detailed further below.

Computer systems of system 200 may include any type or quantity of one or more processors and one or more data storage devices including memory for storing and executing applications or software modules. In one embodiment, the processors and data storage devices are embodied in server-class hardware, such as enterprise-level servers. For example, the processors and data storage devices may include any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the system 200.

The computer systems of system 200 are configured to receive and transmit data between other components to produce a desired technical result. In one embodiment, system 200 is organized into a plurality of layers of a networked computing environment comprising a coordinator 212 and an orchestrator 220. As detailed further below, components of coordinator 212 are in communication with components of orchestrator 220 via a network. The network may be any suitable network or combination of networks and may support any appropriate protocol suitable for communication of data to and from components of coordinator 212 and orchestrator 220 via the cloud and between various other components in the networked computing system 200. The network may include a public network (e.g., the Internet), a private network (e.g., a network within an organization), or a combination of public and/or private networks. The network may be configured to provide communication between various components depicted in the various figures.

The network may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cellular networks, satellite, licensed radio, or a combination of cellular, satellite, licensed radio, and/or unlicensed radio networks.

System 200 may support multiple layers, such as, for example, a presentation layer 223, an application layer 209, a framework layer 225, a platform layer 227, and an avionics layer 229, as shown. In Aerospace Internet of Things (AIoT) systems, AIoT providers may direct their focus toward connecting onboard avionics devices, extracting data from those devices, and sending the data to the cloud for analytics with the help of one or more onboard IoT gateways (e.g., gateway connector library of the avionics SDK factory 228a-n, other gateway SDKs 236 of the avionics layer 229, etc.). In one embodiment, the presentation layer 223 of system 200 includes a plurality of graphical user interfaces (GUI) of applications 202, 204 (e.g., an umbrella application GUI), 206, as well as avionics GUI templates 208. The presentation layer 223 and application layer 209 can include the application associated with system 200 and features hosted therein, including the GUI for a user to interact with the application as well as the business logic of the application. Additional UI features can be added at any time as detailed in the reference architecture The application layer 209 can include one or more hosted applications 214, 216, 218 with corresponding logic and concrete data objects. In some aspects, applications 214, 216, 218 may perform business logic on data streams. Communication between components of the presentation layer 223 (e.g., application GUIs 202, 204, 206) and components of application layer 209 (e.g., applications 214, 216, 218) may be performed using coordinator 212 via the network, which may include use data and security communications.

A connected avionics system, such as that described herein, may have the data stream injected into gateways from multiple onboard avionics subsystems, such as FMS 30, an enhanced ground proximity warning systems (EGPWS), a weather radar, a brakes systems (not depicted), etc. for data transfer to cloud-based analytics. In this respect, orchestrator 220 may be configured to push and pull information from applications 214, 216, 218, for example, upon receipt of instructions from users of application GUIs 202, 204, 206, 208. In some aspects, hosted application 214 can push data objects from orchestrator 220 and/or pull data from data sources in communication with orchestrator 220 (e.g., avionics data such as FMS, 4D flight plan, ground- or aircraft-based traffic management systems, etc.). Orchestrator 220 in turn can be in communication with an object factory 222 of the framework layer 225, which creates the interface for data objects.

The framework layer 225 can be communicatively coupled between the SDKs of platform layer 227 and the applications of the application layer 209 and function as a standard interface that all SDKs can expose. In some aspects, the framework layer 225 creates concrete instances of the SDKs, managing the number of objects created. The object factory 222 can be communicatively coupled to components of the platform layer 227. For example, object factory 222 can be configured to handle objects from the avionics SDK factory 228a-n, user interface (UI) SDKs 230a-n, and platform support services 232a-n. Avionics SDK factory 228a-n can include SDKs related to cFMS, RADAR, wheels and brakes, speech, connected FMS, RADAR, gateway connectors, and the like. UI SDKS 230a-n can include maps widgets, pages widgets, forms widgets, and/or the like. Platform support services 232a-n can include components related to license management, identity and access management, certificate management, launch darkly, cloud connectors, logging and application dynamics, support libraries and the like. In some aspects, platform support services 232a-n can be communicably connected to gateway devices, such as connected gateway devices.

Platform layer 227 can contain all of shared SDKs of the system 200, whereby the shared SDKs contain all the connectivity to external devices and any other content that can be shared across applications. Components of avionics SDK factory 228a-n can include hosted SDKs for avionics and/or flight management such as Flight Management Systems, Enhanced Ground Proximity Warning System (EGPWS), Traffic Collision Avoidance System TCAS, Weather or RADAR Systems, electronic flight bag (EFB) devices, wheels, connected FMS library, speech models, gateway connector libraries, etc. It is understood that these hosted SDKs can be software entities which can be included to generically manage interfaces and connections, provide access to engines, and host other shareable features. Avionics SDK factory 228a-n can be communicatively coupled to the avionics layer 229, including components thereof. For example, avionics SDK factory 228*a*-*n* can be configured to connect with the avionics layer 229 and receive components therefrom. In some aspects, content to be shared that does not exist within a predetermined SDK can be encapsulated within a SDK wrapper. Such SDKs can come prepacked within platform layer 227 and provide core capabilities that can be required by an application (e.g., data logging, connection to both avionics and the cloud, data management, security management, etc.).

Components of the avionics layer 229 can include SDKs of aircraft servers (e.g., ADG400 SDK 234) as well as other gateway SDKs 236. SDKs of aircraft servers can in turn be communicatively coupled (e.g., SDKs of aircraft servers can filter and convert complex avionics data into various streaming formats such as JavaScript Object Notation (JSON), Extensible Markup Language (XML), etc.) and transmit the converted avionics data to various client applications with avionics data processing service (ADPS) gateway 238. ADPS gateway 238 can serve as a point of entry between system 200 as well as a point of entry for a group of micro-services, such as the connected FMS micro-services 240, takeoff-and-landing data systems (TOLD) 242, and/or the like. ADPS gateway 238 may be, for example, configured to be updated each time a new micro-service is added or removed in the connected FMS micro-services 240. ADPS gateway 238 may be implemented as hardware, software, and/or a combination of hardware and software.

A key attribute of the IFD of system 200 is the ability to add additional content as plugins to the existing application, providing extensibility, flexibility, and isolation of application features and customs processing logic. Therefore, in addition to object factory 222, a plugin manager can be communicatively coupled to orchestrator 220, whereby plugin manager can be in communication with registration store. In particular, system 200 includes components of the platform layer 227 and orchestrator 220, including object factory 222, plugin SDK 332*a*-*n* and new SDKs 334*a*-*n* to plug-in, as shown in FIG. 3A and FIG. 3B. In so doing, platform layer 227 (e.g., orchestrator 220) in concert with coordinator 212 enables system 200 to provide an umbrella application that can be found in an app store and once installed enables the purchase and use of additional hosted apps as they become available. For example, newer applications can be readily added at the application layer 209 and/or presentation layer 223.

One or more rules engines of the system may be highly customizable frameworks for complex event processing. The term "engine" as used in this disclosure is understood as a self-contained piece of business functionality with interfaces contained within a hosted SDK (e.g., a microservice). Some non-limiting examples of engines contemplated for use with system 200 and related methods of this disclosure can include an Avionics Engine, a Flight Management Engine (FME), Takeoff and Landing Engine (TOLDE), a Navigation Database Engine, as well as higher order content as a flight plan comparator utility. This enables efficient data filtering where patterns of incoming data are dynamic in nature. It not only helps in reducing the quantity of data but also ensures the quality of data being pushed to the cloud.

The herein discussed rules engine(s) may be used as a framework for building event-based workflows. The rules engine may include one or more of three main components: a message component, e.g., any incoming event; a rules node; and/or a rules chain. The message may refer to incoming data from devices, device life-cycle event, REST API event, RPC request, etc. The rules node may be a function that would be executed on an incoming message. There are many different node types that can filter, transform, and/or execute some action on incoming message. The rules chain may be nodes relate to each other with relations, so the outbound message from rule node is sent to next connected rule nodes.

Below are some common use cases for configuring rule chains: data validation and modification for incoming telemetry or attributes before saving to the database; copy telemetry or attributes from devices to related assets so you can aggregate telemetry, e.g., data from multiple avionics subsystems can be aggregated in related asset; create/update/clear alarms based on defined conditions; trigger actions based on edge life-cycle events, e.g., create alerts if device is online/offline; load additional data required for processing, e.g., load temperature threshold value for a device that is defined in device's customer or tenant attribute; trigger REST API calls to external systems; raise alarms/alerts when complex event occurs and use attributes of other entities inside email template; and/or consider user preferences during event processing. In some aspects, messages transmitted from system 200, such as triggers and/or alerts, can be configured for transmitting information to flight crew and ground controllers for maintenance preparations reducing the aircraft-on-ground (AOG) times. System 200 can also be configured to detect near misses can also be configured in the IFD to build a trend model for early detection of anomalies before faults or malfunctions occur increasing safety.

Figure 4:
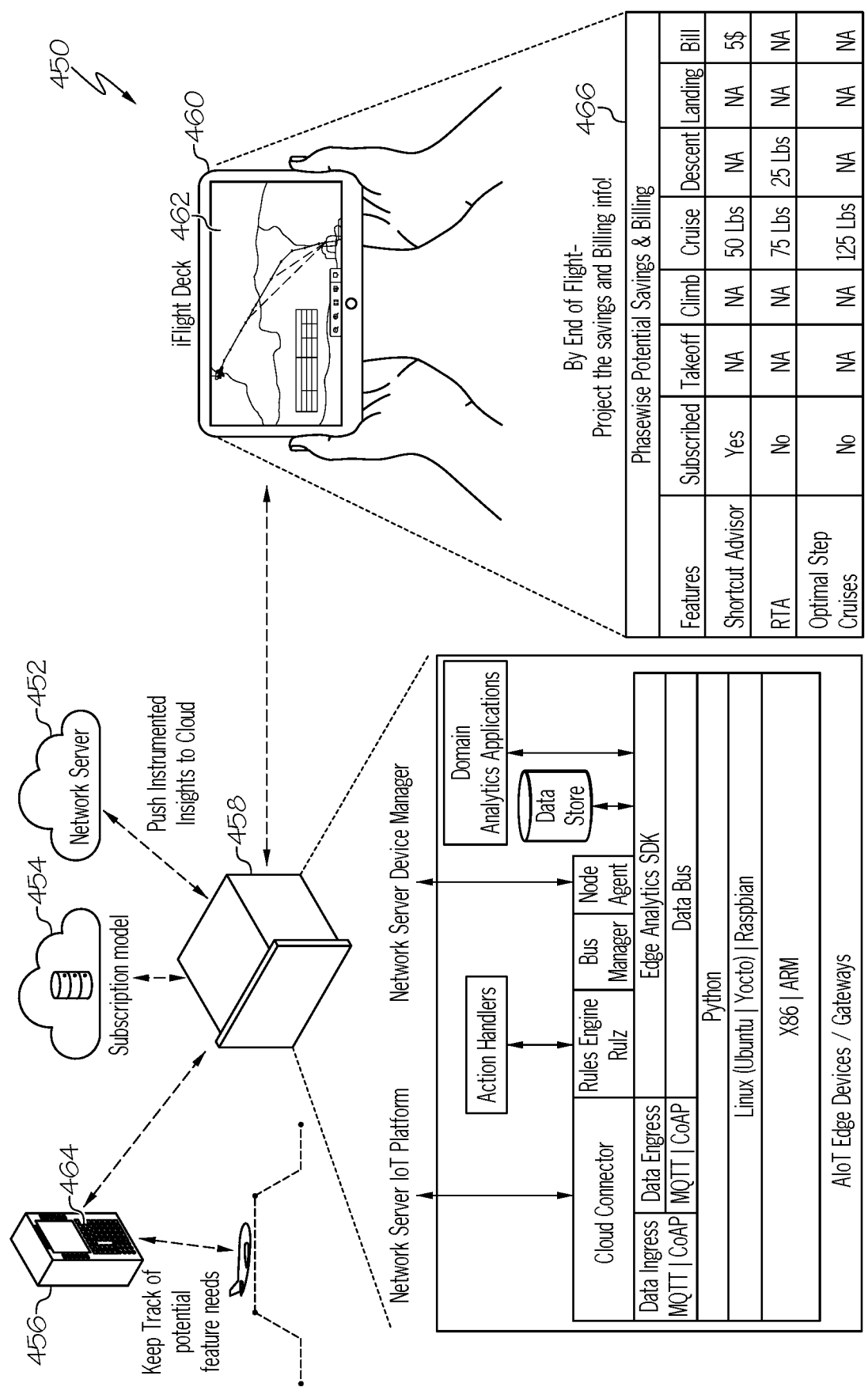
FIG. 4 depicts an exemplary system architecture for providing insights using a flight management system.

FIG. 4 displays a network environment 450 for generating one or more recommendations and determining whether the recommendations were followed by a crew of an aircraft. The network environment 450 includes a network server 452, a database 454, a flight management system 456, a flight data system 458, and a flight management computing device 460, which may include an input/output device 462 (e.g., a touch screen).

The flight management system (FMS) 456 may be a specialized computer system that may automate various in-flight tasks. One function of the FMS 456 may be to manage the flight plan for any given flight. The FMS 456 may receive input from various sensors and systems (not shown), such as, for example, a GNSS system, an INS system, a radio navigation system, etc. to determine the aircraft's position. Using the sensors and systems, the FMS may guide the aircraft along a given flight plan (e.g., from New York to London, as shown in FIG. 1). The FMS may be controlled and displayed, for example, through a Control Display Unit (CDU) 464 which CDU 464 may incorporate various input/output devices (e.g., a small screen and keyboard and/or touchscreen). The FMS 456 may send a flight plan for display to an Electronic Flight Instrument System (EFIS), Navigation Display (ND), or Multifunction Display (MFD), which systems and displays could be displayed on the input/output device 462 of the computing device 460, for example. In some embodiments, the FMS 456 may include, as one example, the flight management computing device 460, the control display unit 464, and a cross talk bus.

Still referring to FIG. 4, the flight data system 458 may include, for example, one or more gateways that are configured to receive data from one or more aircraft systems (e.g., an FMS, a radar system, an engine system, an auxiliary power unit, wheel systems, brake systems, navigation, collision avoidance, flight recorders, automatic traffic control systems, etc.) and sensors (e.g., flow sensors, pressure sensors, temperature sensors, altimeters, airspeed indicators, position sensors, oxygen sensors, force sensors, vibration sensors, compasses, magnetometers, gyroscopes, altitude heading sensors, tachometers, etc.) to record data generated by the aircraft during flight. The flight data system 458 may include one or more modules configured to enact one or more of its processes. For example, the flight data system 458 may include a network server platform, a network server device manager, an action handler module, a domain analytic applications module, a data store, a cloud connector module, a rules engine module, a bus management module, a node agent module, a data ingress/egress module(s), an edge analytics software development kit (SDK), a data bus, and one or more software API modules (e.g., a python API, a Linux API, etc.) The flight data system 458 may acquire, record, download, and analyze data in order to make one or more recommendations to the operators of the aircraft in real time.

Still referring to FIG. 4, the flight management computing device 460 may include one or more preprogrammed instructions (e.g., stored in a communicatively coupled database) which may cause the flight management computing device 460 to demonstrate one or more advantages of using insights generated by the flight data system 458 to a user of the system 450, which insights may be generated based on one or more features subscribed to by the operators of the aircraft. Exemplary features are shown in an advantages chart 466 of FIG. 2 and may include, among other things, a shortcut adviser, an RTA, and optimal step cruises. In some embodiments, the advantages chart 466 may display whether or not a feature is subscribed to, a potential savings for using such a feature, a cost to use such a feature, as well as other aspects related to the feature.

Figure 5:
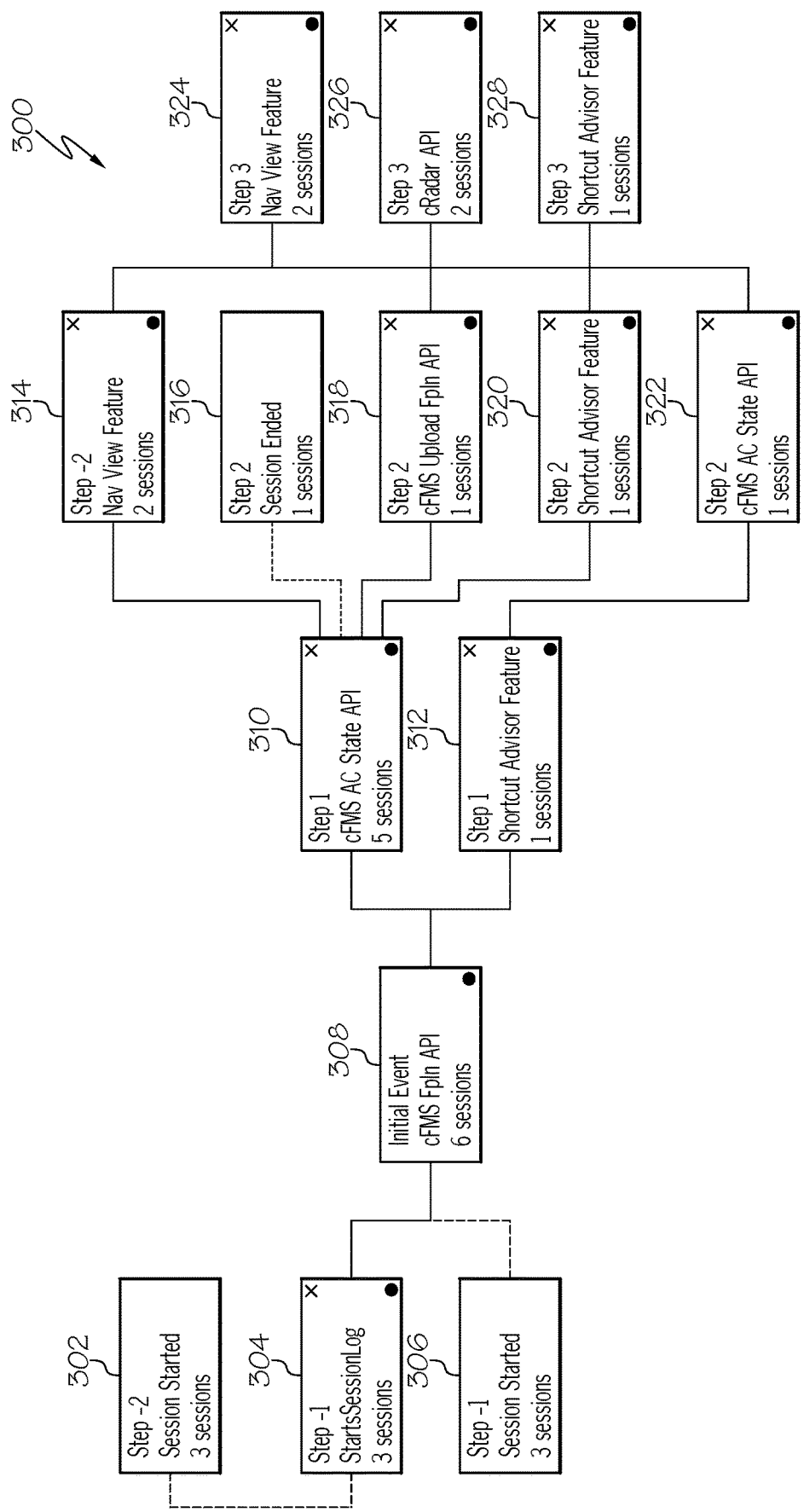
FIG. 5 depicts a flow chart for providing insights using a flight management system.

FIG. 5 depicts an exemplary flowchart 300 for determining whether a user and/or a group of users have interacted with various features of the system 450 for recommending actions to the aircraft operators. The various features may be accessed via one or more subscription settings (as explained in greater detail herein) and the subscription settings of the user and the actual usage of the various features may be tracked and an optimal subscription setting and/or optimal features for the user may be developed based on the subscription settings and an actual usage of the features of the flight planning tool as described herein. Flowchart 300 depicts an exemplary method for determining such optimal features. At step 302, an operator may start a session. At step 304, the session log may be started to record one or more actions of the user(s) and/or the system during the session. Alternatively, at step 306, the user can start the session without starting a session log.

At step 308, a user may access a connected FMS flight plan API. The display at step 308 may include a relatively large number of sessions (e.g., 6 sessions) because, in general, a user (e.g., a pilot) may routinely access an FMS flight plan API to get from a takeoff location to a landing location. In some embodiments, the connected FMS flight plan API may be a default location for beginning use of a flight plan At step 310, a user may access a connected FMS state API, for example, to determine a current FMS state. At step 312, a user may access a shortcut adviser feature, e.g., the shortcut advisory displayed to a user in the chart of FIG. 1. Other features which may be viewable and editable by a user include, for example, a navigation view feature, a radar API, and one or more other features. Each time a user enters or exits a feature, either for another feature or when exiting the FMS system completely, the system may tally the various uses, keeping a complete tally of the type of interaction, its duration, and other information about the user's interaction with the system such that the system can accurately log which functions and features of the system the user is utilizing and accurately charge the user for using the subscribed features as will be described in greater detail herein.

At step 314, the user may access a nav view feature, which may provide a user access to various navigational aids at an input/output device, for example, the number of times the user accesses the nav view feature may be recorded. At step 316, the user may end a session after having accessed the cFMS aircraft state API at step 310. At step 318 the user may access a cFMS flight plan upload tool API for uploading one or more flight plans and may go on to later access one or more other features. At step 320, a user may access a shortcut advisor feature, which feature may recommend one or more shortcuts or savings of aircraft resources. At step 322, a user may access a cMFS aircraft state API and may go on to access one or more additional features at, for example, steps 324, 326, and 328. At step 324, the user my access the nav view feature. At step 326, the user may access the connected radar API and at step 328, the user may access a shortcut advisor feature.

Figure 6:
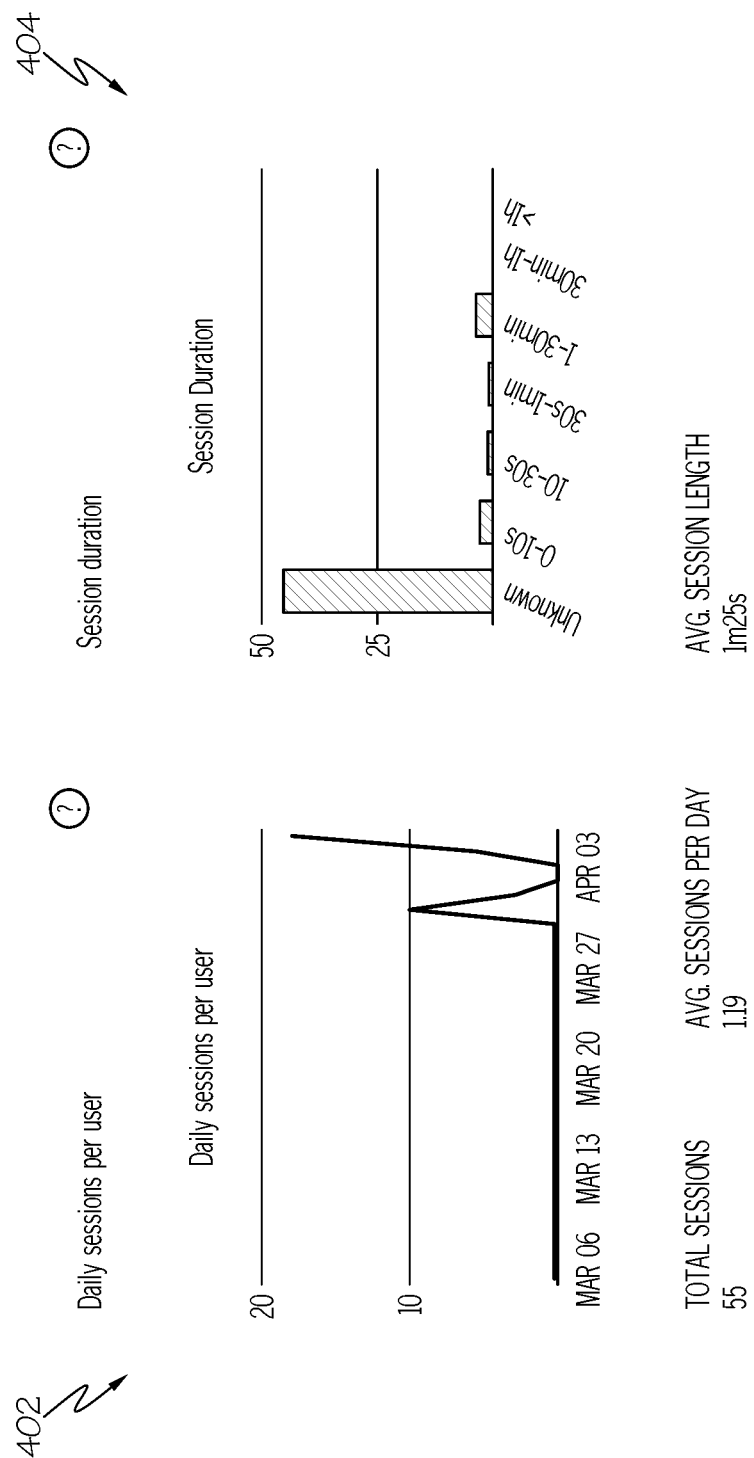
FIG. 6 depicts exemplary key performance indicators provided using a flight management system.

Referring to FIG. 6, in some embodiments, the system may record the actual usage of the various features by users of the system and the various figures described herein depict some exemplary charts, graphs, and other graphics for generating value based on the actual usage of the system described herein. For example, the actual usage of a user may be tracked using one or more of a daily sessions per user, a session duration, a total number of events for a given time period, an average number of events, a user number, a count, and a count per user. FIG. 6 shows specifically a daily sessions per user and/or a session duration for a given user, for a given group of users, for an entire user set, etc. As shown in chart 402, the daily sessions per user can be tracked over time to determine whether a user group is using features more often over a given period. The FMS can track different information, for example, a number of total sessions for a user group and an average number of sessions per day. In some embodiments, as shown in chart 404, the session duration may be recorded and reported in order to best understand how long a typical use of the FMS lasts in order to optimize a user group's interaction with the FMS. For example, an average session duration can be calculated and reported or the number of individual sessions lasting for a given time period (e.g., 0-10 s, 10-30 s, 30 s-1 min, etc.) can be recorded and reported.

Figure 7A:
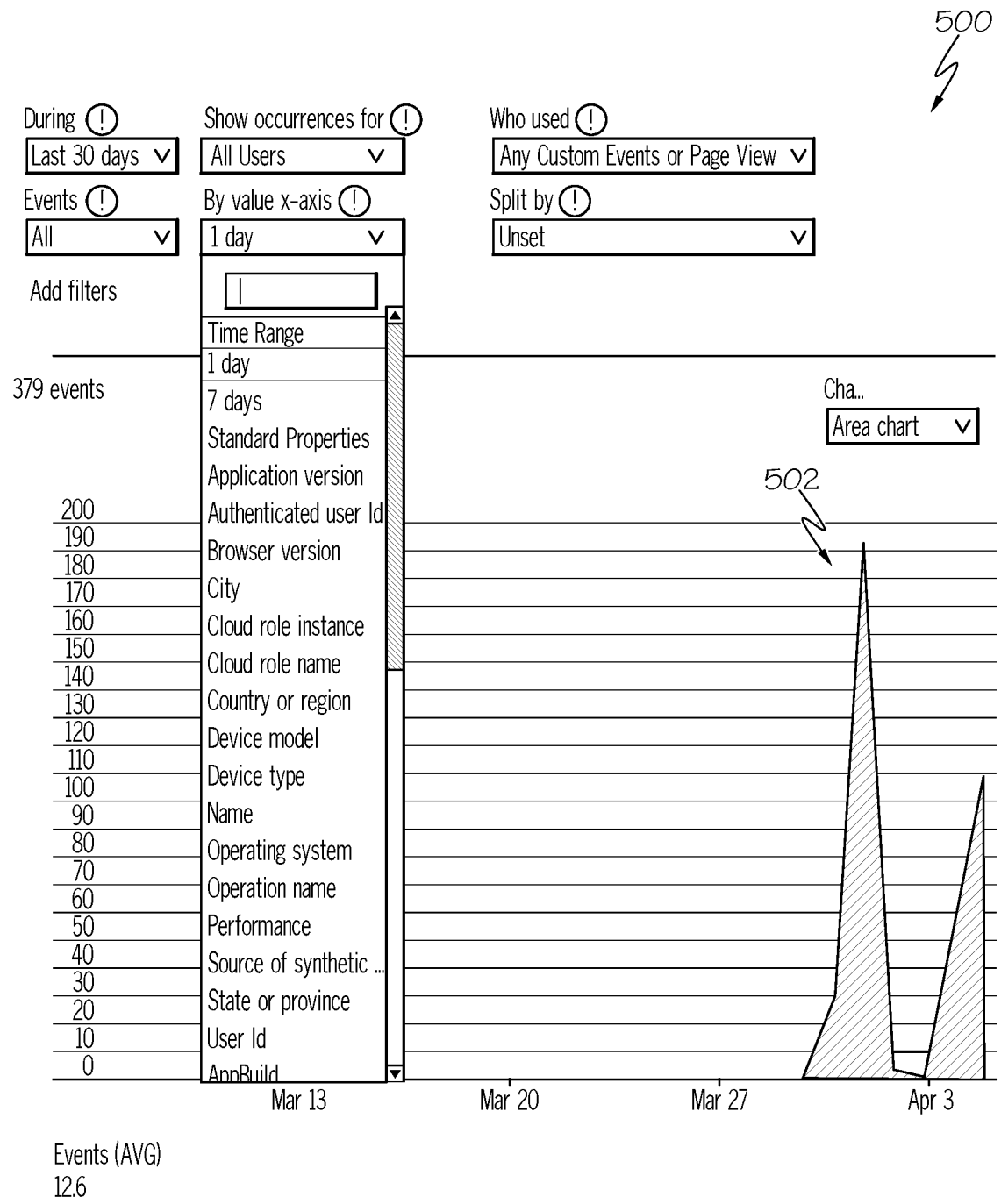
FIG. 7A depicts further exemplary key performance indicators provided using a flight management system.
Figure 7B:
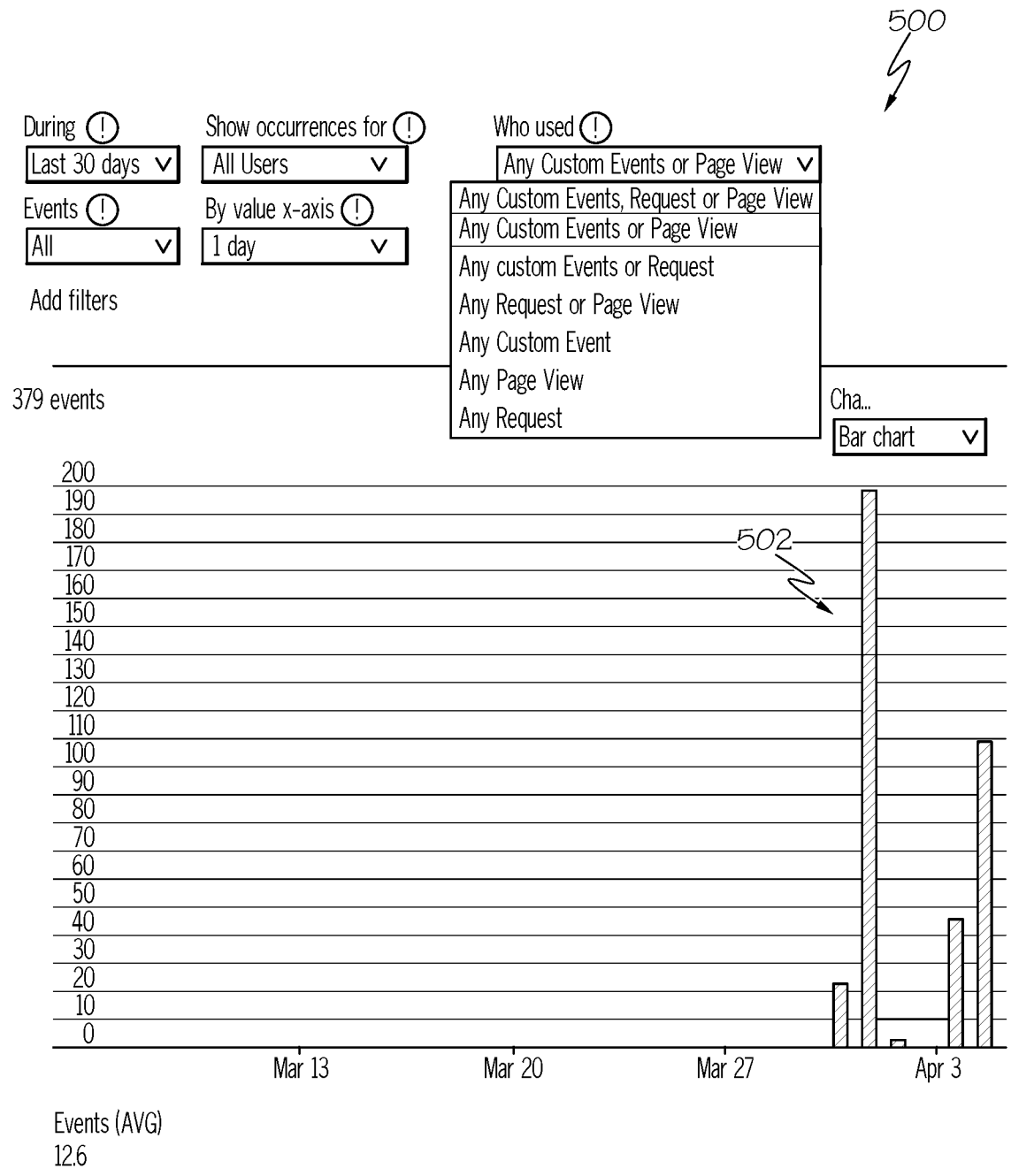
FIG. 7B depicts yet further exemplary key performance indicators provided using a flight management system.

Referring to FIG. 7A and FIG. 7B, a total number of events 502 may be tracked and recorded and displayed in a chart 500. What qualifies as an event may be customizable by a user of the system and one or more default lists of events may be programmed into the system. Default events may include, for example, interaction with a given application, closing of a given application, opening of a given application, etc. Hence, the user's interaction with the system can be more accurately tracked and monitored in order to best value the use of the various systems which the user(s) utilize to generate events. In some embodiments, an average number events per a given time period can be tracked (e.g., average number of events per day for a given number of days, etc.) As shown by the differences between FIG. 7A and FIG. 7B, the graphics displayed to a user may be customizable.

Figure 9:
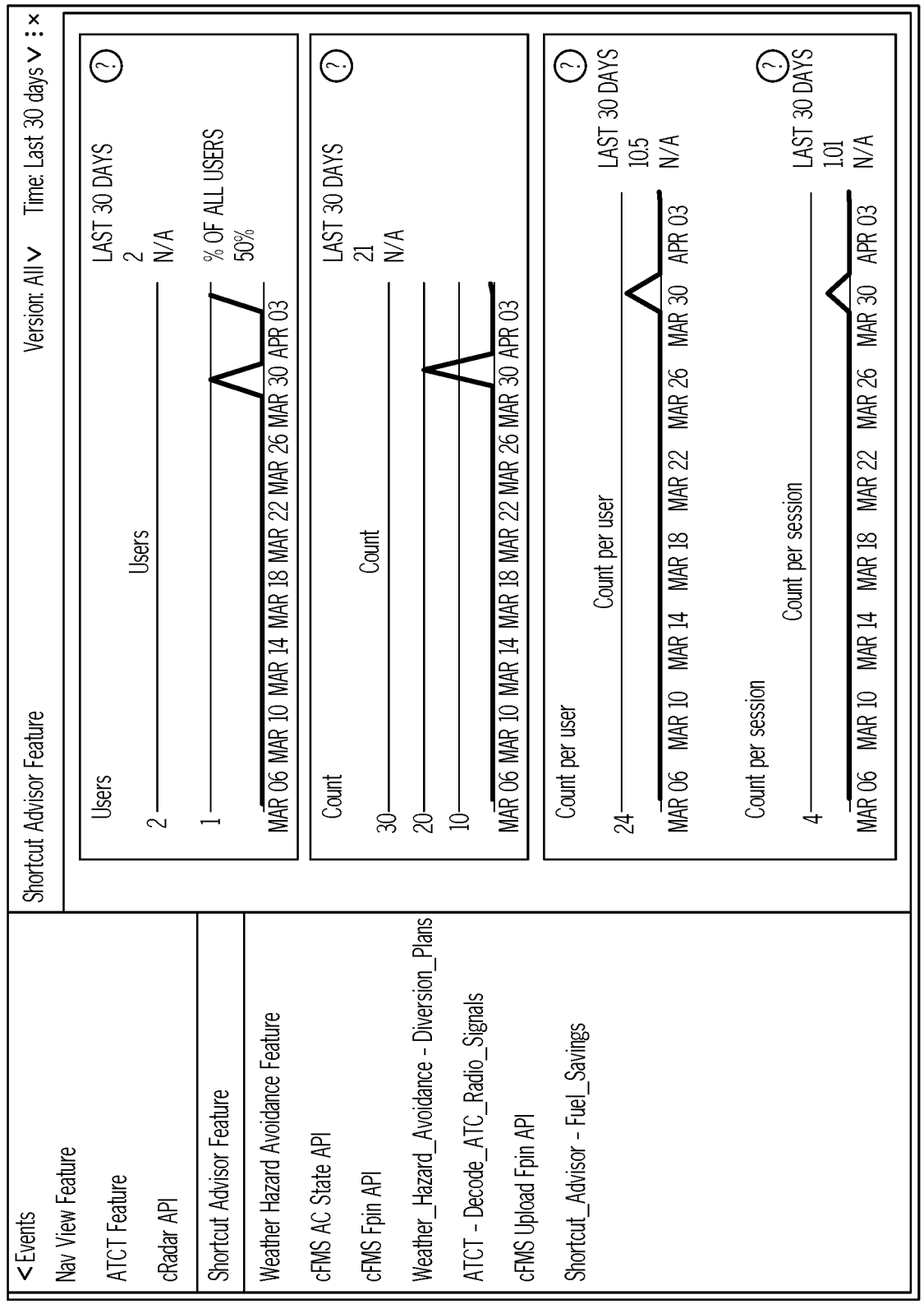
FIG. 9 depicts exemplary charts for tracking one or more key performance indicators using a flight management system.

Referring to FIG. 8, in some embodiments, the system may be used to generate one or more searchable lists of events 602 and to display information 604 related to such searchable list of events 602. The displayed information may be fileable and sortable based on, for example, a magnitude of the data. As shown in FIG. 6, each time a user accesses one of the features (e.g., the "Nav View Feature," the "ATCT feature," "the cRadar API," etc.), the system may track a count (e.g., "29," "26," "24," etc.) The system may further count a number of accesses over a given period of time to determine a trend in the accessing of the feature. Further, the system can be configured to determine how many users actually access or changed a feature and deliver number of accesses per accessing user. Referring to FIG. 8 and FIG. 9, the information displayed in FIG. 8 can be graphically depicted in order to best display the information to a user of the system.

Figure 10:
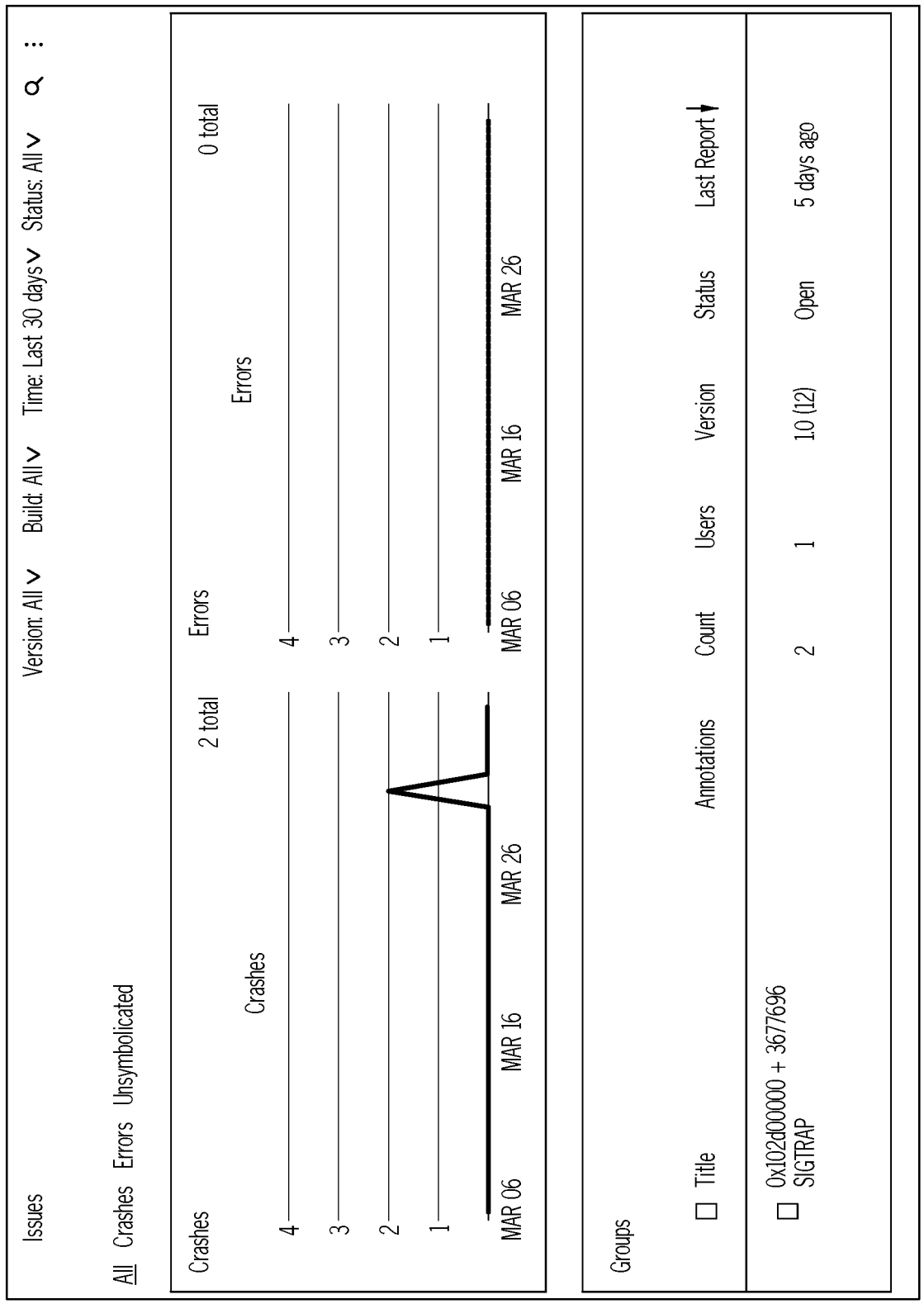
FIG. 10 depicts one or more key performance indicators for tracking with a flight management system.
Figure 11:
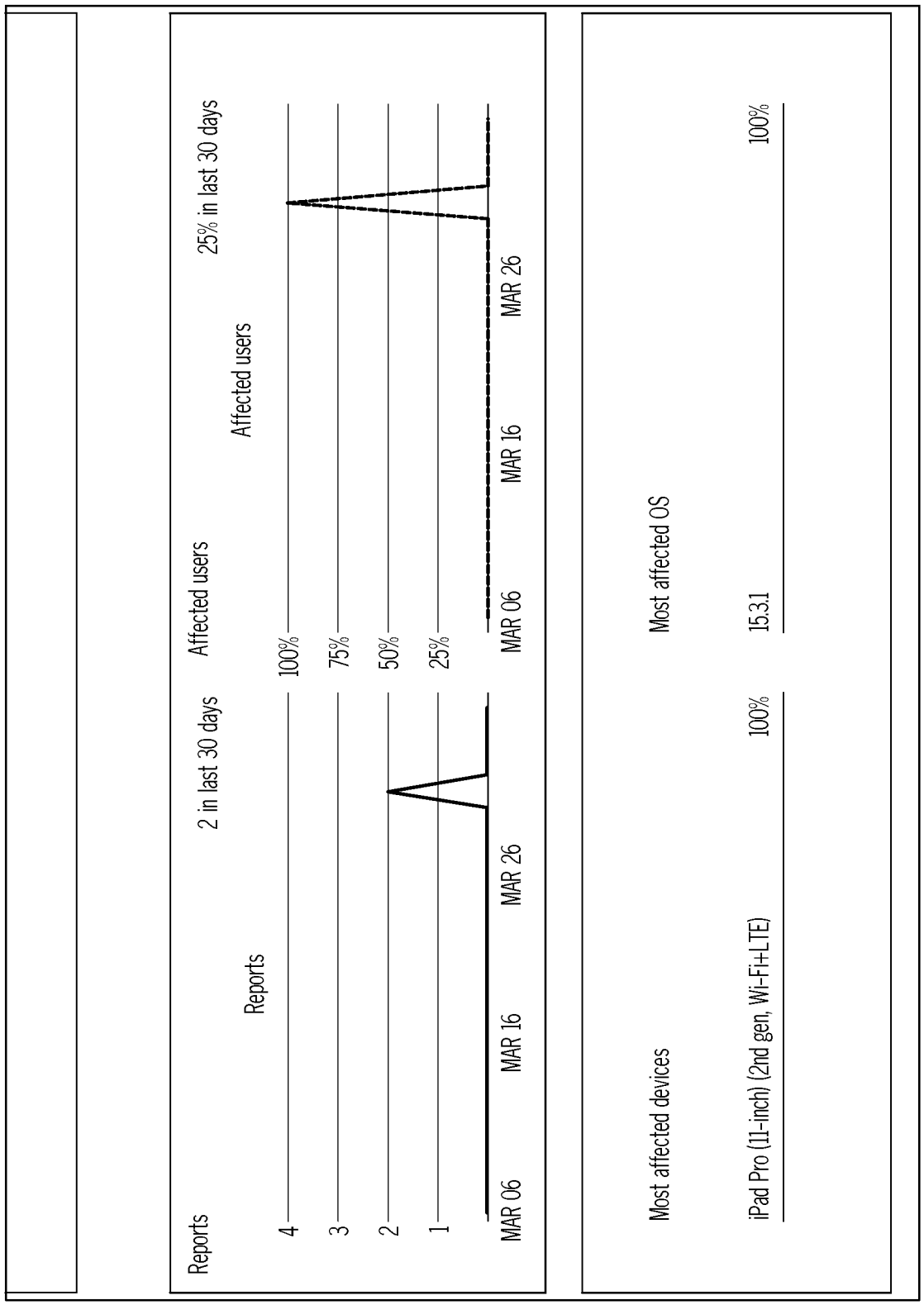
FIG. 11 depicts additional key performance indicators for tracking with a flight management system.

Referring to FIG. 10, the system may be configurable to track and analyze one or more system crashes, system errors, and/or system symbolization. A system user may utilize the number of cashes, errors, and/or system symbolization, for example, to determine an overall health of the system in order to debug the system and/or to determine what changes need to be made to the system. The number of crashes and/or system errors can be tracked over time and one or more tickets may be tracked to solve one or more of the crashes and/or system errors. Referring to FIG. 11, the system may include one or more report trackers and/or affected user trackers. In some embodiments, the system may track a most affected device and/or most affect operating system in order to determine with which devices and operating system the system works best/worst.

Referring to FIG. 12, an exemplary log of events for tracking one or more events using a flight management system is shown. More specifically, FIG. 12 shows the process level details of various applications described herein, including the tasks running in parallel and their status at the time of a potential event. FIG. 12 provides various details about a call stack and a background thread of information during the event. Using the information described and shown in FIG. 12, a user (e.g., a developer) could conduct a root cause analysis or other type of analysis of a given event, tracking the various lines of software as they occur (e.g., are executed) in real time.

Figure 13:
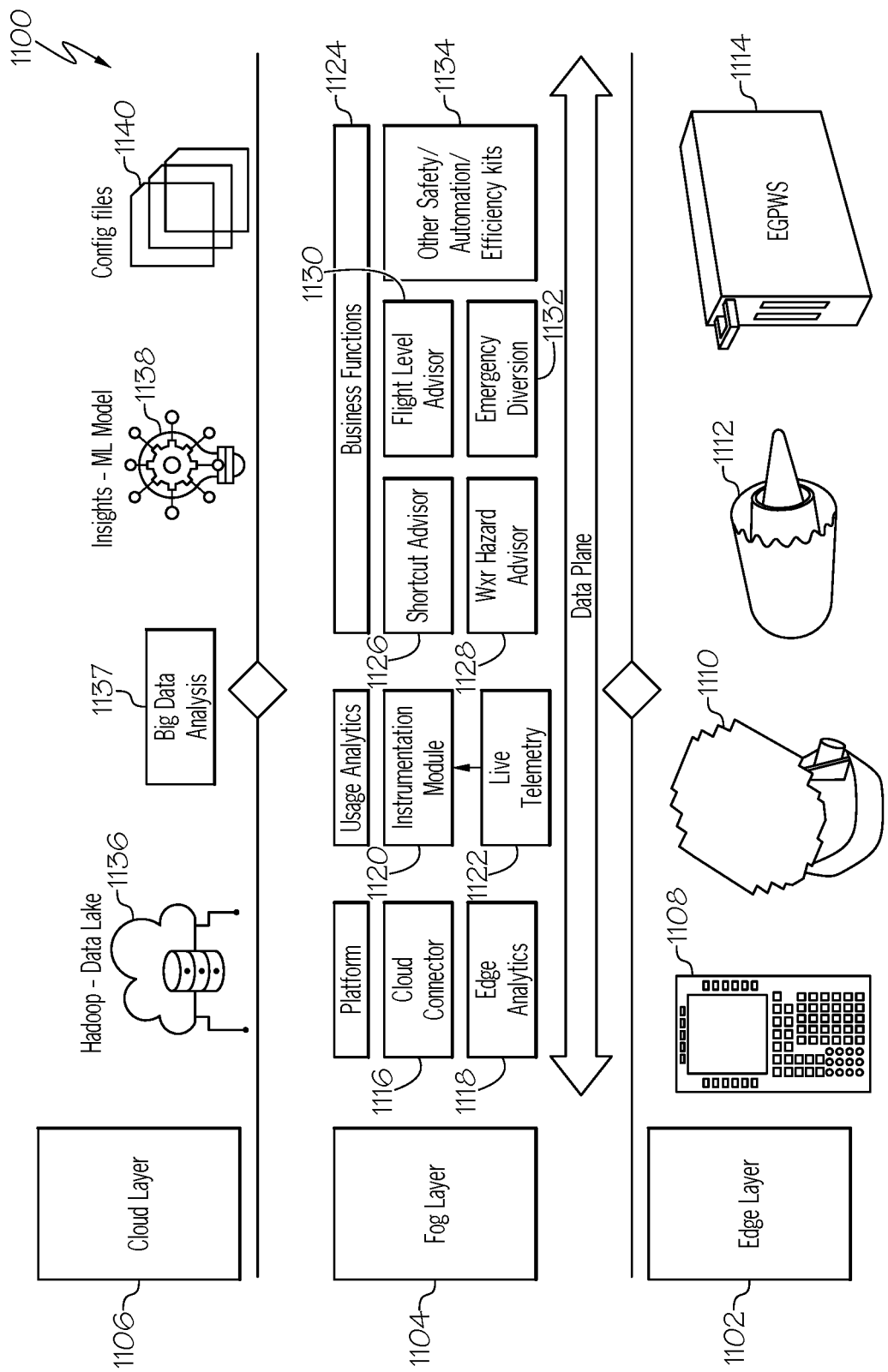
FIG. 13 depicts a multilayer environment for developing one or more insights using a flight management system.
Figure 14A:
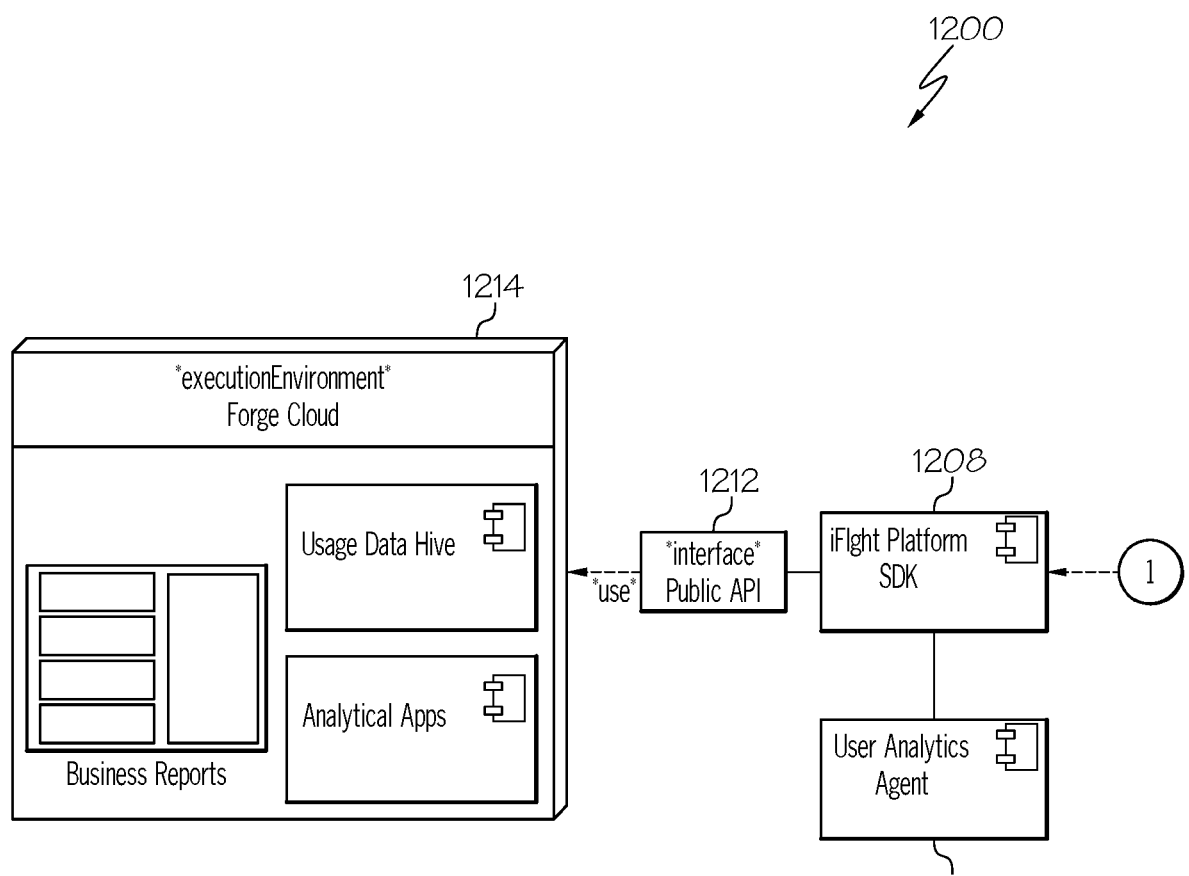
FIG. 14A depicts a system environment for developing one or more insights using a flight management system.
Figure 14B:
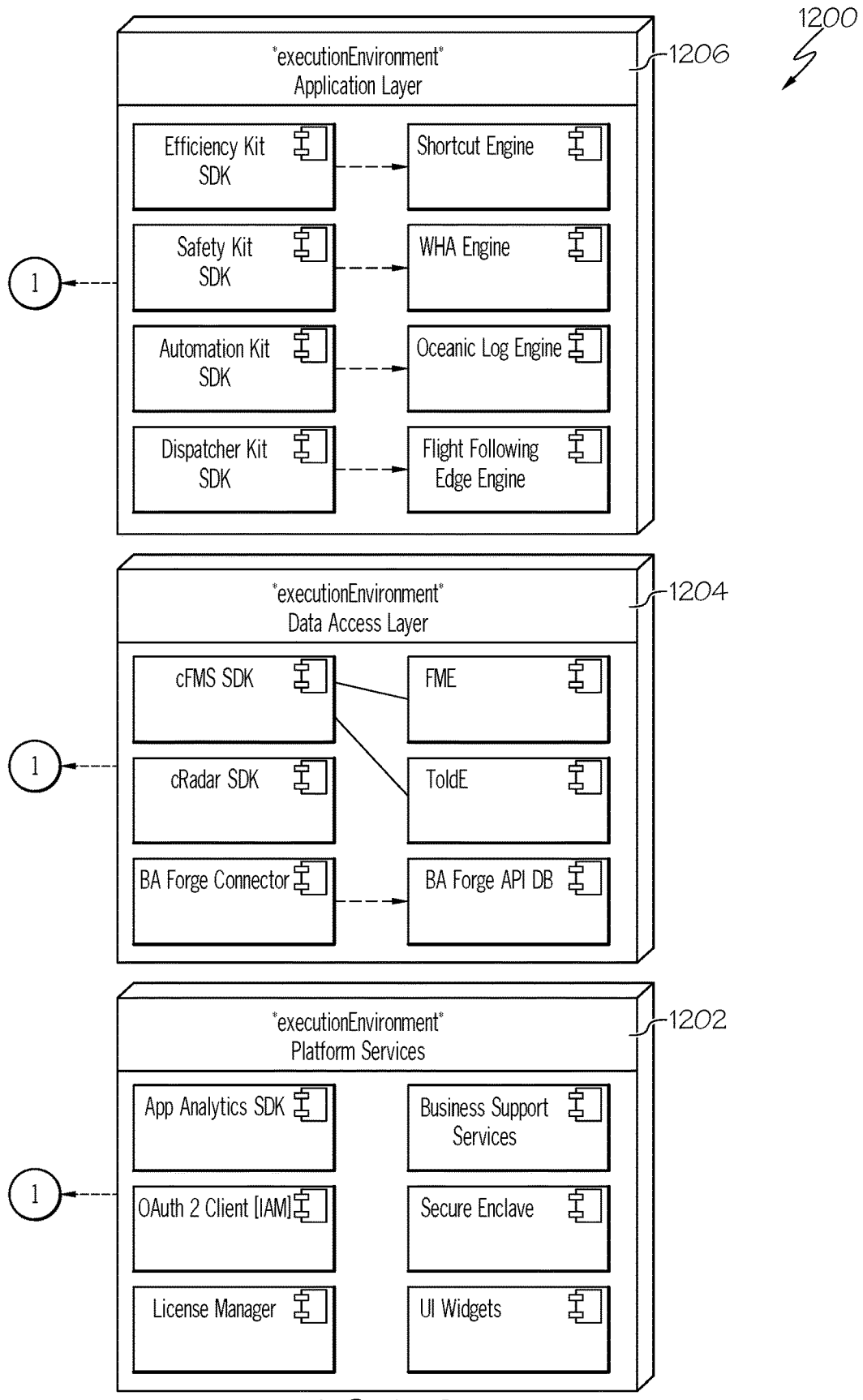
FIG. 14B further depicts a system environment for developing one or more insights using a flight management system.

Referring to FIG. 13, a system diagram 1100 demonstrates one possible embodiment of a system hierarchy for generating in-flight insights and immediately demonstrating the value of such generated in-flight insights to a user. The system diagram 1100 includes an edge layer 1102, a fog layer 1104, and a cloud layer 1106. At the edge layer 1102, the system may include an FMS 1108, one or more aircraft sensing systems such as a radar system 1110, one or more engine systems 1112, and an enhanced ground proximity warning system (EGPWS) 1114. At the fog layer 1104, the system may include a cloud connector module 1116, an edge analytics module 1118, an instrumentation module 1120 (which may receive input from a live telemetry module 1122), and one or more business function modules 1124 (i.e., features) including, for example, a shortcut advisor feature 1126, a weather hazard advisor feature 1128, a flight level advisor feature 1130, an emergency diversion feature 1132, and one or more other features 1134. The various features may provide one or more recommended flight settings that include one or more recommendations based on, for example, a flight path, a weather condition, an emergent diversion, and an optimal altitude. At the cloud layer 1106, the system may include a data lake 1136, one or more data analysis algorithms 1137, one or more machine learning models 1138 that may generate one or more insights, and one or more configuration files 1140 for configuring the various data received through the fog layer 1104. As shown in FIG. 13, in some embodiments, the plurality of sensors may be at an edge layer and the flight planning tool may be at a fog layer FIG. 14A and FIG. 14B show an exemplary system architecture 1200 for constructing the system for generating insights based on real time data described herein. The system architecture includes a platform services module 1202, a data access layer 1204, an application layer 1206, a platform software development kit (SDK) 1208, a usage analytics agent 1210, a public API 1212, and a network server interface 1214. The platform SDK 1208 may include, for example, a fog manager, a fog service mesh, a fog instrumentation service, one or more platform services, connector components connecting to one or more avionics systems, connector components for connecting to one or more external cloud environments, domain-specific analytics engines (e.g., Energy Management Engine, Shortcut Engine, FME, TOLDE, SDKs, platform services like identity and access management, license management, etc.) The usage analytics agent 1210 may keep track of all features (both subscribed and unsubscribed) and generate usage insights for the users of the system.

More specifically, FIG. 14A depicts components necessary to perform usage analytics of the various applications and features described herein. At one or more of the edge devices in the system described herein, it may be necessary to run, for example, a user analytics agent. The user analytics agent may monitor usage of the various features and post live telemetry information to an external server (e.g., a cloud server such as, for example, the Forge Cloud server). In some embodiments, the user analytics agent may post live telemetry information to the external server through the platform described herein. Further, at the external server (e.g., the cloud server) a data hive may capture live telemetry coming from the various edge devices. The data from the edge devices can be further processed by other applications to generate business intelligence (BI) reports to gain insights on the features that are used (e.g., the critical features, most/least utilized features, etc.) Such information can be used to provide the most useful features to a user of the system (e.g., a client).

FIG. 14B depicts various features and software modules running at the different software layers of the system (e.g., the application layer, data access layer, and platform services layer). In use, the user analytics agent can connect with any of these layers to send the usage information to an external server.

Figure 15:
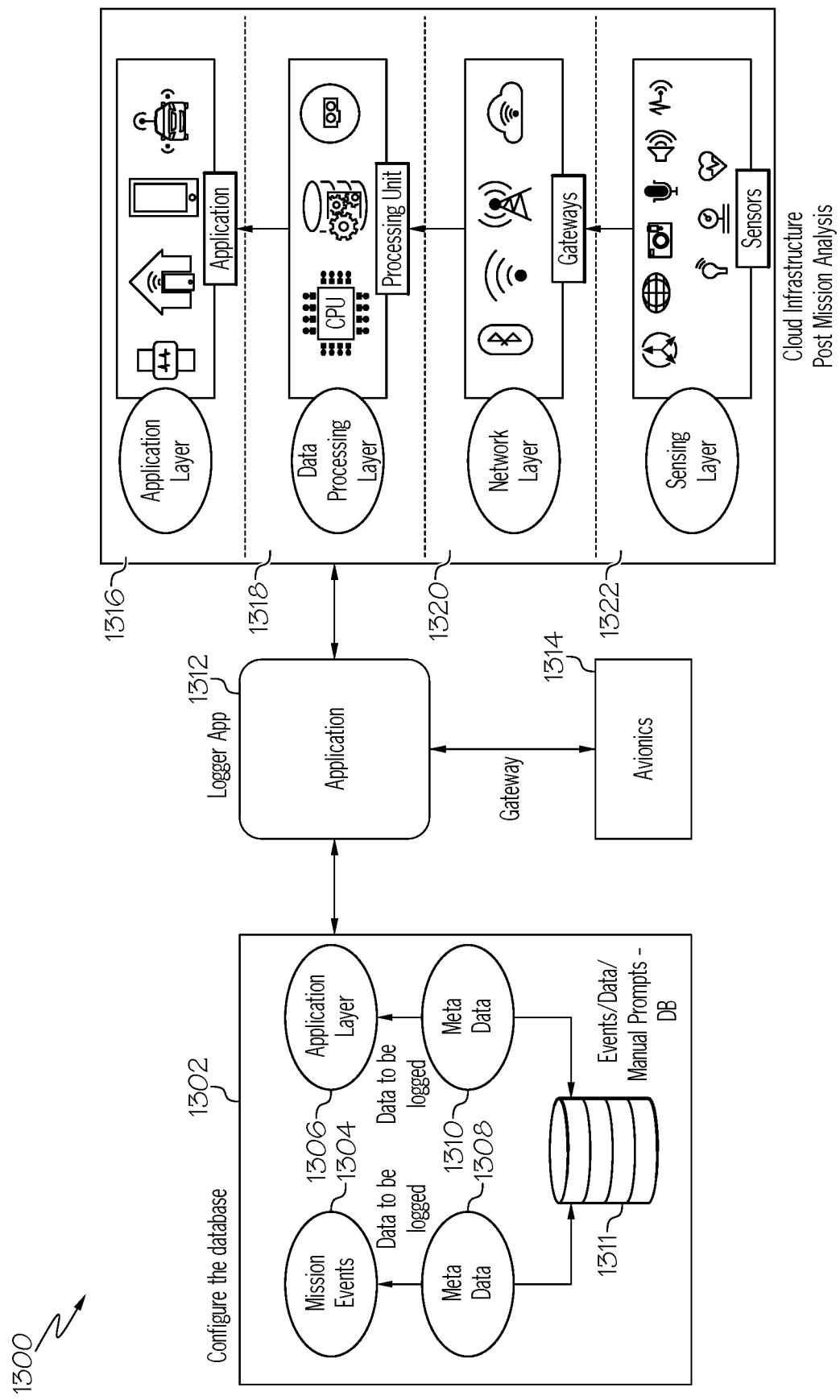
FIG. 15 depicts a system environment for making one or more recommendations in real time based on mission events.

Referring to FIG. 15, a system 1300 for a logging service hosted in an external flight planning tool that can be configured to customize data logging is shown. The system includes a configurable database 1302 that may be used to log one or more mission events 1304 and/or one or more data entry prompts 1306. The mission events 1304 and the data entry prompts may be stored with metadata 1308, 1310 in a mission event database 1311. The system 1300 further includes an application 1312 (e.g., software) for logging one or more events and the application 1312 is communicatively coupled to the avionics hardware and software 1314 on the aircraft. The application 1312 may communicatively couple with onboard avionics systems and sensors and with a cloud-based infrastructure, which may be used to, for example, conduct post-mission analysis (e.g., in an application layer 1316, a data processing layer 1318, a network layer 1320, and a sensing layer 1322).

The system 1300 includes the configurable database 1302, which may contain one or more trigger events (or "mission events"), and corresponding data that may be extracted from avionics and sensor systems (e.g., flight recorder, FMS, etc.) and temporarily stored in the external flight planning tool, which may be housed, for example, in the application 1312 and/or in the application layer 1316 of the cloud-based infrastructure. In embodiments, manual data entries, which may be required for logging, can be input based on policy or regulatory documents and the system 1300 may prompt entry of such entries and/or provide a form such that the application prompts a user to receive manual entries that will then be added to the logs. For example, in a situation in which an aircraft is making a transoceanic flight (e.g., as shown in FIG. 1), mission events like sequences of legs, coast-in, coast-out, equitime point, point of safe return, etc. can be configured and when triggered, the state of the aircraft at that point of time can be logged using a system such as that described with respect to FIG. 1. Manual entry triggers in the case of a transoceanic flight log could include entries during pre-flight, coast-in, coast-out and post-flight to record altimeter settings, navigation accuracy checks from, for example, both pilot and co-pilot sides of a cockpit etc. such that manually-recorded data entries during the transoceanic flight are manually logged and may be maintained on board the aircraft.

Still referring to FIG. 15, in some embodiments, based on the configured database, applications associated therewith may set the data access periodicity or subscribe to particular avionics-based system event to receive the data that is necessary to log. In embodiments, in order to minimize a data transfer to/from the aircraft, the data may be temporarily stored with a timestamp until the end of the flight or until crew manually requests archiving of the data on the cloud. Upon completion of the flight or upon a specific request from the crew, for example, the logged flight data may be sent to the cloud with appropriate labeling (e.g., aircraft registration, flight number, crew details, etc.) for retention in an off-aircraft database for a configured period of time.

Figure 16:
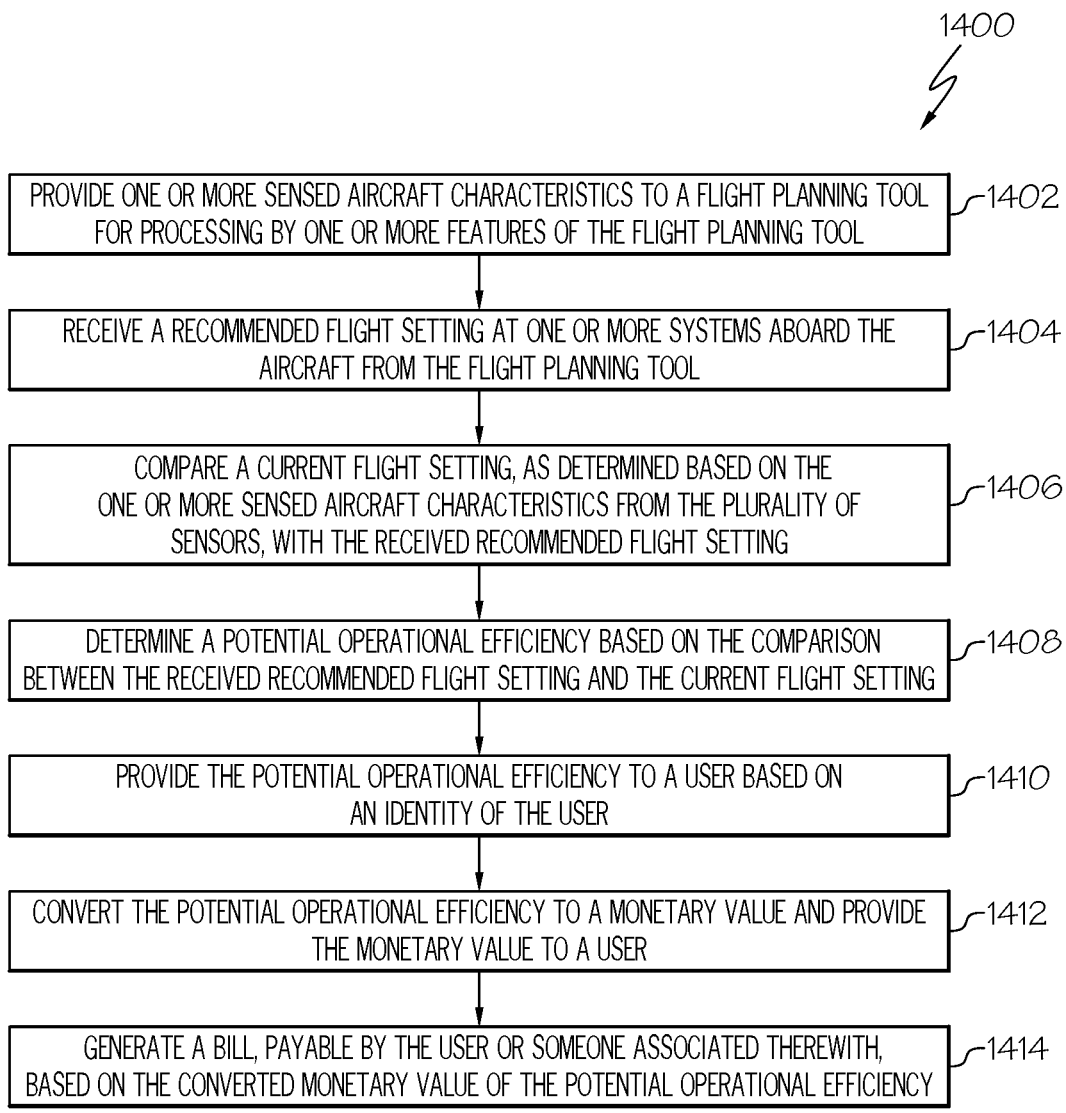
FIG. 16 depicts a method for generating one or more recommendations regarding a flight status.

Referring now to FIG. 16, a method of providing a potential operational flight efficiency to a user is shown. It is to be understood that the method shown in FIG. 16 is exemplary and additional, fewer, and/or other steps may be incorporated to the method without departing from the scope of the current claims.

At step 1402, one or more of sensed aircraft characteristics may be provided to a flight planning tool for processing by one or more features of the flight planning tool. The sensed aircraft characteristics may be sensed, for example, by one or more of one or more of flow sensors, pressure sensors, temperature sensors, altimeters, airspeed indicators, position sensors, oxygen sensors, force sensors, vibration sensors, compasses, magnetometers, gyroscopes, altitude heading sensors, tachometers, navigation, collision avoidance, flight recorders, and automatic traffic control systems. The flight planning tool may be on board the aircraft and/or external to the aircraft and the aircraft may comprise one or more communications systems for communicatively coupling with the flight planning tool.

At step 1404, one or more systems aboard the aircraft may receive a recommended flight setting from the flight planning tool based on the processing by the flight planning tool. The recommended setting could include, for example, one or more recommended navigation changes (e.g., changes to one or more waypoints, etc.), one or more recommended altitude changes (e.g., one or more altitude step settings, etc), one or more aircraft settings changes (e.g., an engine speed, a system configuration, etc.) or other settings related to aircraft navigation and operational efficiency.

At step 1406, a current flight setting, as determined based on the one or more sensed aircraft characteristics from the plurality of sensors, may be compared with the received recommended flight setting. For example, an aircraft heading (e.g., a current heading, a heading from one waypoint to another, etc.) may be compared with a recommended aircraft heading as received from the flight planning tool. In some embodiments, the current flight setting may be automatically logged at the time it is determined based on the one or more sensed aircraft characteristics. For example, in some instances, logs for flights (e.g., transoceanic flights) may require the verification of a "next waypoint" and "next to next waypoint" prior to reaching any particular waypoint along a planned route. In many instance, this has to be done a certain amount of time before the particular waypoint (e.g., 2 min prior to the waypoint). The logging of this event can be configured with associated data (outbound magnetic course and distance to the next waypoint presented in the flight management computer and verified for agreement with the planned course). Further, the flight management computer and other associated systems may be used to verify that, for example, after 10 minutes of having passed a waypoint, there is no deviation from a programmed route of flight. The system could verify this lack of deviation, at least in part by, for example, checking for cross track error. As another example, the system may use a steering long-range navigation system ("LRNS") to verify a "TO" waypoint is consistent with a currently-active route clearance.

At step 1408, a potential operational efficiency may be determined based on the comparison between the received recommended flight setting and the current flight setting. For example, if the recommended heading would save a certain amount of fuel when traveling from one waypoint to another (e.g., as determined by a flight management system) and would not lead to any collision or danger with other aerial objects (e.g., as determined by an air traffic control system) then this would be an operational efficiency (i.e., the saving of the fuel cost, the labor cost associated with adding additional fuel, etc.). If the recommended heading would also reduce flight distance/time and cause the aircraft to land earlier, then this would also potentially be an operational efficiency as it might save crew rest, avoid passenger delays, reduce engine and system running hours, etc. However, to continue with the example, if the alternate heading would reduce a flight distance but not save fuel and/or time (e.g., if a wind direction/speed caused flying at a particular heading to be less fuel/time efficient) or would result in other inefficiencies (e.g., there would be other flights landing at the hypothetical new landing time thus preventing the subject flight from landing and requiring circling the target airport, etc.) then changing a heading would not result in an operational efficiency and the change would not be recommended.

At step 1410, the system may provide the potential operational efficiency to a user based on an identity of the user. For example, if the user is logged in and has a profile that is authorized to receive operational efficiencies as determined by, for example, an identity and access management system, then the system may provide the potential operational efficiency to the user.

At step 1412, the system may convert the potential operational efficiency to a monetary value and provide the monetary value to a user. The monetary value may be based on, for example, the cost of fuel saved if the operational efficiency is enacted, the amount of man-hours and/or engine-hours saved if the operational efficiency is enacted, or based on some other factor. The monetary value for potential savings may be provided to a user even if the user is not using a particular application such as to receive recommendations from the application. That is, the monetary value may be provided as an enticement to the user to subscribe to use the application. Accordingly the identity (i.e., user profile) of the user may include one or more subscription settings and the recommended flight setting and/or potential operational efficiency may be provided to the user based on the subscription settings of the user. The subscription settings could be stored, for example in a user profile module.

At step 1414, the system may generate a bill, payable by the user or someone associated therewith, based on the converted monetary value of the potential operational efficiency. The generated bill may be a fraction of the monetary value of the potential operational efficiency. For example, if the system recommends an altered course that results in a savings of 50 lbs of fuel, the system may automatically convert the 50 lbs of fuel to a monetary value and present a bill to the user based on the cost of the savings. The conversion can be calculated in multiple ways. For example, the conversion could be based on a current price of fuel at a particular location (e.g., at the airport where the flight is to land, etc.), the conversion could be based on a predetermined fuel price, the conversion could be based on an average fuel price, or other factors. The fraction of the saved money which is used to calculate the bill could be agreed upon by the parties and automatically supplied by the system. For example, the provider of the hardware and software that includes the flight planning tool could agree with the user that the user will pay 10%, 25%, 50%, etc. of the savings that are generated using the system to the provider.

It should now be understood that insights based on data generated by avionics systems and other on-board systems can be used to generate real-time actionable insights during flight preparations and during a flight and that such insights can be provided to a pilot and/or aircraft crew based on a subscription service subscribed to by the crew. In some embodiments, benefits of the subscription service can be provided to the crew in order to inform the crew how the benefits could increase efficiency and reduce costs associated with aviation operations.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for an aircraft comprising:
    a plurality of sensors configured to sense one or more aircraft characteristics of an aircraft system and generate a signal based on the sensed aircraft characteristic,
    a processing device communicatively coupled to the plurality of sensors, and
    a memory communicatively coupled to the processing device and storing processor-readable instructions that when executed by the processing device cause the system to:
    provide one or more of the sensed aircraft characteristics to a flight planning tool for processing by one or more features of the flight planning tool;
    receive a recommended flight setting from the flight planning tool based on the processing by the flight planning tool;
    compare a current flight setting as determined based on the one or more sensed aircraft characteristics from the plurality of sensors with the received recommended flight setting;
    determine a potential operational efficiency using at least one machine learning model based on the comparison between the received recommended flight setting and the current flight setting;
    display or transmit the potential operational efficiency to a user based on an identity of the user; and
    change at least one operation of the aircraft in response to an input received from the user based on the potential operational efficiency displayed or transmitted to the user.

2. The system of claim 1, wherein the identity of the user includes one or more subscription settings and the recommended flight setting is provided to the user based on the subscription settings of the user.

3. The system of claim 2, wherein the subscription settings of a user are tracked and an optimal subscription setting for the user is developed based on the subscription settings and an actual usage of the features of the flight planning tool.

4. The system of claim 3, wherein the actual usage is tracked using one or more of a daily sessions per user, a session duration, a total number of events for a given time period, an average number of events, a user number, a count, and a count per user.

5. The system of claim 1, wherein the plurality of sensors include one or more of flow sensors, pressure sensors, temperature sensors, altimeters, airspeed indicators, position sensors, oxygen sensors, force sensors, vibration sensors, compasses, magnetometers, gyroscopes, altitude heading sensors, tachometers, navigation, collision avoidance, flight recorders, and automatic traffic control systems.

6. The system of claim 1, wherein the memory further includes processor-readable instructions that when executed by the processing device cause the system to:
    convert the potential operational efficiency to a monetary value and provide the monetary value to a user.

7. The system of claim 6, wherein the memory further includes processor-readable instructions that when executed by the processing device cause the system to:
    generate a bill, payable by the user, based on the converted monetary value of the potential operational efficiency, wherein:
    the bill is a fraction of the monetary value of the potential operational efficiency.

8. The system of claim 1, wherein the recommended flight setting includes one or more recommendations based on a flight path, a weather condition, an emergent diversion, and an optimal altitude.

9. The system of claim 8, wherein the plurality of sensors are at an edge layer and the flight planning tool is at a fog layer.

10. The system of claim 1, wherein the flight planning tool includes a flight management system.

11. A method comprising:
    providing one or more sensed aircraft characteristics to a flight planning tool for processing by one or more features of the flight planning tool;
    receiving a recommended flight setting from the flight planning tool based on the processing by the flight planning tool;
    comparing a current flight setting as determined by one or more of a plurality of sensors with the received recommended flight setting;
    determining a potential operational efficiency using at least one machine learning model based on the comparison between the received recommended flight setting and the current flight setting;
    providing the potential operational efficiency to a user based on an identity of the user; and
    changing at least one operation of the aircraft in response to an input received from the user based on the potential operational efficiency provided to the user.

12. The method of claim 11, wherein the identity of the user includes one or more subscription settings and the recommended flight setting is provided to the user based on the subscription settings of the user.

13. The method of claim 12, wherein the subscription settings of a user are tracked and an optimal subscription setting for the user is developed based on the subscription settings and an actual usage of the features of the flight planning tool.

14. The method of claim 13, wherein the actual usage is tracked using one or more of a daily sessions per user, a session duration, a total number of events for a given time period, an average number of events, a user number, a count, and a count per user.

15. The method of claim 11, wherein the plurality of sensors include one or more of flow sensors, pressure sensors, temperature sensors, altimeters, airspeed indicators, position sensors, oxygen sensors, force sensors, vibration sensors, compasses, magnetometers, gyroscopes, altitude heading sensors, tachometers, navigation, collision avoidance, flight recorders, and automatic traffic control systems.

16. The method of claim 11, further comprising:
converting the potential operational efficiency to a monetary value and provide the monetary value to a user.

17. The method of claim 16, further comprising:
generating a bill, payable by the user, based on the converted monetary value of the potential operational efficiency, wherein:
the bill is a fraction of the monetary value of the potential operational efficiency.

18. A method of operating an aircraft comprising:
providing one or more of sensed aircraft characteristics to a flight planning tool for processing by one or more features of the flight planning tool;
receiving a recommended flight setting from the flight planning tool based on the processing by the flight planning tool;
comparing a current flight setting as determined by one or more of a plurality of sensors with the received recommended flight setting and automatically logging the current flight setting in a flight log;
determining a potential operational efficiency using at least one machine learning model based on the comparison between the received recommended flight setting and the current flight setting;
providing the potential operational efficiency to a user based on an identity of the user; and
changing at least one operation of the aircraft in response to an input received from the user based on the potential operational efficiency provided to the user.

19. The method of claim 18, wherein the flight log is maintained on board the aircraft.

20. The method of claim 18, wherein the aircraft is operating on a transoceanic flight.

* * * * *